(12) United States Patent
Horie et al.

(10) Patent No.: US 6,720,997 B1
(45) Date of Patent: Apr. 13, 2004

(54) IMAGE GENERATING APPARATUS

(75) Inventors: Daisaku Horie, Itami (JP); Shinya Matsuda, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/221,418

(22) Filed: Dec. 28, 1998

(30) Foreign Application Priority Data

| Dec. 26, 1997 | (JP) | 9-360605 |
| Dec. 26, 1997 | (JP) | 9-360606 |
| Dec. 26, 1997 | (JP) | 9-360607 |
| Dec. 26, 1997 | (JP) | 9-360608 |

(51) Int. Cl.⁷ ............................................. H04N 5/225
(52) U.S. Cl. ..................... 348/218.1; 382/284; 382/294
(58) Field of Search ........................... 348/36, 37, 38, 348/39, 218.1; 382/284, 294

(56) References Cited

U.S. PATENT DOCUMENTS

| 5,138,460 A | * | 8/1992 | Egawa | 348/239 |
| 5,907,353 A | * | 5/1999 | Okauchi | 348/218.1 |
| 5,982,951 A | * | 11/1999 | Katayama et al. | 348/584 |
| 6,005,987 A | * | 12/1999 | Nakamura et al. | 348/42 |
| 6,075,905 A | * | 6/2000 | Herman et al. | 348/588 |
| 6,101,265 A | * | 8/2000 | Bacus et al. | 345/665 |
| 6,157,747 A | * | 12/2000 | Szeliski et al. | 345/419 |
| 6,205,259 B1 | * | 3/2001 | Komiya et al. | 382/284 |
| 2003/0025803 A1 | * | 2/2003 | Nakamura et al. | 348/218.1 |

FOREIGN PATENT DOCUMENTS

| JP | 3-210873 | 9/1991 | |
| JP | 6-141246 | 5/1994 | |
| JP | 9-23330 | 1/1997 | |
| JP | 09-214924 | * 8/1997 | H04N/7/15 |

OTHER PUBLICATIONS

"Image Analysis Handbook", Tokyo University Publishing, First Edition, Jan. 17, 1991, pp. 462–467.

* cited by examiner

*Primary Examiner*—Andrew Christensen
*Assistant Examiner*—Erin Wisdahl
(74) *Attorney, Agent, or Firm*—Sidley Austin Brown & Wood LLP

(57) ABSTRACT

An electronic camera is provided with an image sensor, an image processor, and a controller for the image sensor and the image processor so that: the image sensor executes a first mode of sensing a whole image in a specified region of the object, and a second mode of sensing partial images in a plurality of divided parts of the specified region, and the image processor combines the plurality of sensed partial images into a single image corresponding to the whole image in the specified region, each sensed partial image being transformed with reference to the sensed whole image.

20 Claims, 20 Drawing Sheets

FIG. 18

| 0 | -1/4 | 0 |
|---|---|---|
| -1/4 | 1 | -1/4 |
| 0 | -1/4 | 0 |

FIG. 19

| 1/16 | 1/8 | 1/16 |
|---|---|---|
| 1/8 | 1/4 | 1/8 |
| 1/16 | 1/8 | 1/16 |

IMAGE GENERATING APPARATUS

This application is based on patent application Nos. 9-360605, 9-360606, 9-360607, and 9-360608 filed in Japan, the contents of which is hereby incorporated by reference.

BACKGROUND OF THE INVENTION

This invention relates to an image generating apparatus, particularly to an image generating apparatus which partially senses an image of an object while dividing it into a plurality of blocks, combining the respective partial images by applying an image processing to generate a photographed image of an whole object.

Conventionally, methods for improving a resolution have been proposed in connection with electronic cameras using CCDs or like solid-state image sensing elements, according to which methods an object is partially sensed while being divided into a plurality of blocks and a sensed image of the entire object is generated by combining the respective partial images in such a manner as to paste them together.

Japanese Unexamined Patent Publication No. 6-141246 discloses an image generating apparatus as follows. An object light image is divided into a plurality of parts in such a manner that boundary portions thereof overlap with each other, and the respective partial light images are sensed by a plurality of sensing elements. The partially sensed images are combined in such a manner as to be pasted together at their overlapping boundary portions, thereby obtaining an image of the whole object. In this apparatus, if there is an image displacement in the boundary portions, the image displacement is corrected before the combination of partial images. The correction of image displacement is performed by defining the displacement in the terms of a parallel movement and a rotational movement, and moving the adjacent partial images in parallel or rotation.

Japanese Unexamined Patent Publication No. 3-210873 discloses an image generating apparatus as follows. An image of an original larger than an image reading area is read part by part in such a manner that boundary portions of partial images overlap with each other. These partial images are recorded on a recording sheet while being connected at the overlapping portions, thereby forming an image of the whole original.

Japanese Unexamined Patent Publication No. 9-23330 discloses an image processing apparatus in which an image combination is performed by extracting particular areas having less brightness change in boundary portions of adjacent partial images, and combining the partial images on the reference of the particular areas.

As smoothing of image data at combining portions, there has been the linearly weighted-averaging as shown in "Image Analysis Handbook" published by Tokyo University Publishing. Such smoothing is performed to smoothen density variations between adjacent partial images by mixing image data in specified portions of the adjacent partial images in a predetermined proportion.

In the case that an object is sensed while being divided into a plurality of parts and an image of the entire object is obtained by combining the partial images in such a manner as to paste them together, it is convenient if a photographer can immediately monitor an obtained photographed image (i.e., combined image). However, in the conventional image generating apparatus, the image of the whole object is obtained by, after sensing the object part by part, combining a plurality of partially sensed images in such a manner as to paste them together. Accordingly, the photographed image (image of the whole object) the photographer wants to monitor can be obtained only after the image combination, and he/she cannot monitor the photographed image immediately after a shutter release operation. Therefore, in high resolution photographing, there is a blank period between the shutter release operation and a point of time when the photographed image can be monitored in a monitor-display operation of the photographed image. This results in a reduced operability.

In the divisional sensing, a distortion is likely to occur in the boundary portion of each partial image due to a camera shake or a characteristic performance of a camera. In particular, in the case of generating a plurality of partial images by changing the sensing direction or the optical axis with a single image sensor, a distortion is likely to occur in the boundary portion of each partial image due to an oblique sensing caused by the change in the optical axis.

In the apparatus of Japanese Unexamined Patent Publication No. 6-141246, the combination of partial images is performed based on information on displacements in a limited area of the overlapping boundary portion. Accordingly, there is a likelihood that a difference in the image distortion correction for the combination becomes noticeable in the respect of areas other than the boundary portions, e.g., a likelihood that a line image extending over the adjacent two partial images has a distortion or a bent in the boundary portions. If there is not a peculiar image for image combination in the boundary portions, it will become difficult to attain accurate image combination.

The parallel or rotational movement is performed based on information on an image displacement in such limited areas as the boundary portions. Accordingly, a disagreement caused by the parallel or rotational movements makes the accurate image combination very difficult.

In the image processing apparatus of Japanese Unexamined Patent Publication No. 9-23330, a delicate operation is required to extract particular areas having less brightness change in the boundary portions. Accordingly, there has been hoped a further improvement to generate a combined image with a reduced displacement.

In the image processing using the linearly weighted-averaging, a line image having a displacement between adjacent partial images can be corrected into a line image having no displacement. However, the edge of the corrected line image becomes dull or cannot have a sharp contrast as the brightness level is lowered in the corrected image.

SUMMARY OF THE INVENTION

It is an object of the present invention to provide an image generating apparatus which has overcome the problems residing in the prior art.

According to an aspect of the invention, an image generating apparatus comprises: an image sensing device which senses an image of an object; an image processor which processes a sensed image; a display device which displays a processed image; and a controller which controls the image sensing device, the image processor, and the display device so that: the image sensing device executes a first sensing of sensing a whole image in a specified region of the object, and a second sensing of sensing partial images in a plurality of divided parts of the specified region; the image processor combines the plurality of sensed partial images into a single image corresponding to the whole image in the specified region; and the display device displays the sensed whole image before the combination of sensed partial images.

According to another aspect of the invention, an image generating apparatus comprises: an image sensing device which senses an image of an object; an image processor which processes a sensed image; and a controller which controls the image sensing device and the image processor so that: the image sensing device executes a first sensing of sensing a whole image in a specified region of the object, and a second sensing of sensing partial images in a plurality of divided parts of the specified region; and the image processor combines the plurality of sensed partial images into a single image corresponding to the whole image in the specified region, each sensed partial image being transformed with reference to the sensed whole image.

According to still another aspect of the invention, an image generating apparatus comprises: an image sensing device which senses an image of an object; an image processor which processes a sensed image; and a controller which controls the image sensing device and the image processor so that: the image sensing device executes a first sensing of sensing a whole image in a specified region of the object, and a second sensing of sensing partial images in a plurality of divided parts of the specified region; and the image processor combines the plurality of sensed partial images into a single image corresponding to the whole image in the specified region by determining respective positions of the sensed partial images with reference to the sensed whole image, and combining the sensed partial images with one another based on the determined positions.

According to yet still another aspect of the invention, an image generating apparatus comprises: an image sensing device which senses an image of an object; an image processor which processes a sensed image; and a controller which controls the image sensing device and the image processor so that: the image sensing device senses partial images in a plurality of divided parts of a specified region of the object, a boundary portion of each partial image overlapping a boundary portion of an adjacent divided part; and the image processor combines the plurality of sensed partial images into a single image corresponding to the whole image in the specified region by correcting the level of respective sensed partial images based on image data in the boundary portion thereof, averaging the image data with a predetermined weight to generate boundary images, applying an edge enhancement to the boundary images, and combining the edge enhanced boundary images with the other portions of the corrected partial images than the boundary portions.

These and other objects, features and advantages of the present invention will become more apparent upon a reading of the following detailed description and accompanying drawings.

BRIEF DESCRIPTION OF THE DRAWINGS

FIGS. 12A and 12B are diagrams showing enlarging and reducing directions with respect to a straight line, wherein FIG. 12A shows the enlargement and reduction in straight line direction, and FIG. 12B shows the enlargement and reduction in arc directions;

FIGS. 13A to 13C are diagrams showing an exemplary combining method when there are a difference in brightness level and a pattern displacement in images at boundary portions, wherein FIG. 13A shows a partial image on the left side, FIG. 13B shows a partial image on the right side, and FIG. 13C shows a combined image obtained by pasting both partial images at the boundary portions together;

FIGS. 17A to 17D are waveform charts showing an image generating processing of boundary portions to be combined, in which processing edge enhancement and smoothing are both performed, wherein FIG. 17A shows a signal Sa representing the image data sequence of the strip-shape Ra and a signal Sb representing the image data sequence of the strip-shape Rb having their brightness level adjusted, FIG. 17B shows a signal Sc obtained by weighted-averaging the signals Sa, Sb after the brightness level adjustment, FIG. 17C shows a signal Sc' obtained by enhancing the edge of the signal Sc, and FIG. 17D shows a signal Sc" obtained by smoothing the projecting edges of the signal Sc';

FIG. 18 is a diagram showing an exemplary filter for the edge enhancement;

FIG. 19 is a diagram showing an exemplary filter for the smoothing,

FIGS. 20A to 20D are waveform charts showing an image generating processing of the boundary portions to be combined, in which the edge enhancement and smoothing are both performed, in the case that there is a large displacement between partial images on the left and right sides, wherein FIG. 20A shows the signal Sa representing the image data sequence of the strip-shape Ra and the signal Sb representing the image data sequence of the strip-shape Rb having their brightness level adjusted, FIG. 20B shows the signal Sc obtained by weighted-averaging the signals Sa, Sb after the brightness level adjustment, FIG. 20C shows the signal Sc' obtained by enhancing the edge of the signal Sc, and FIG. 20D shows the signal Sc" obtained by smoothing the projecting edges of the signal Sc';

FIGS. 21A to 21D are waveform charts showing an image generating processing of the boundary portions to be combined, in which the edge enhancement and smoothing are both performed, in the case that there is a small displacement between partial images on the left and right sides, wherein FIG. 21A shows the signal Sa representing the image data sequence of the strip-shape Ra and the signal Sb representing the image data sequence of the strip-shape Rb having their brightness level adjusted, FIG. 21B shows the signal Sc obtained by weighted-averaging the signals Sa, Sb after the brightness level adjustment, FIG. 21C shows the signal Sc' obtained by enhancing the edge of the signal Sc, and FIG. 21D shows the signal Sc" obtained by smoothing the projecting edges of the signal Sc';

DETAILED DESCRIPTION OF THE PREFERRED EMBODIMENTS OF THE INVENTION

Figure 1:
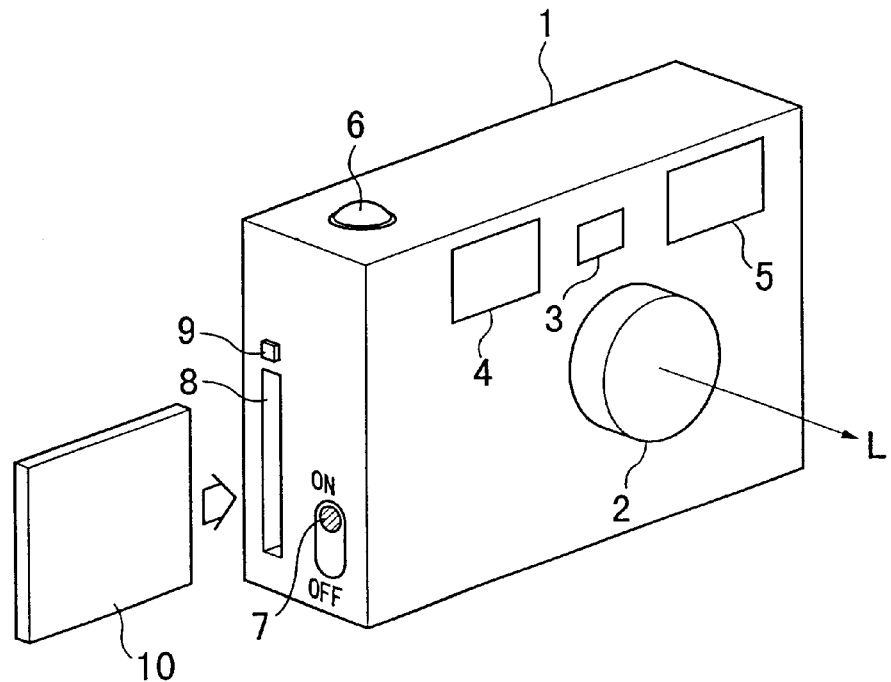
FIG. 1 is a perspective view showing an external configuration of an electronic camera embodying the invention.
Figure 2:
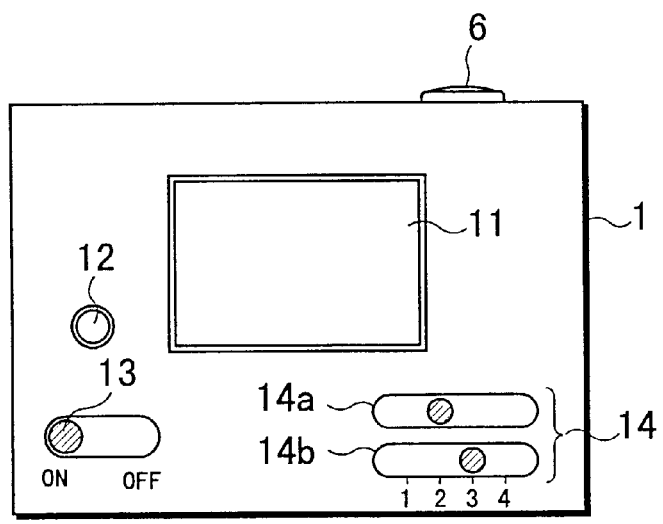
FIG. 2 is a rear view of the electronic camera.

An electronic camera will be described as an embodiment of the invention. FIG. 1 is a perspective view showing an external configuration of the electronic camera, FIG. 2 is a rear view of the electronic camera, and FIG. 3 is a schematic perspective view showing a sensing system of the electronic camera.

In the electronic camera 1, an image sensing unit 2 is provided substantially in the middle of its front surface such that an optical axis L is changeable or inclinable. A light meter 3 for measuring a brightness of an object is provided above the image sensing unit 2 and a distance meter 4 for measuring a distance to the object is provided on the left side of the light meter 3. Further, a flash 5 is provided on the right side of the light meter 3.

Figure 3:
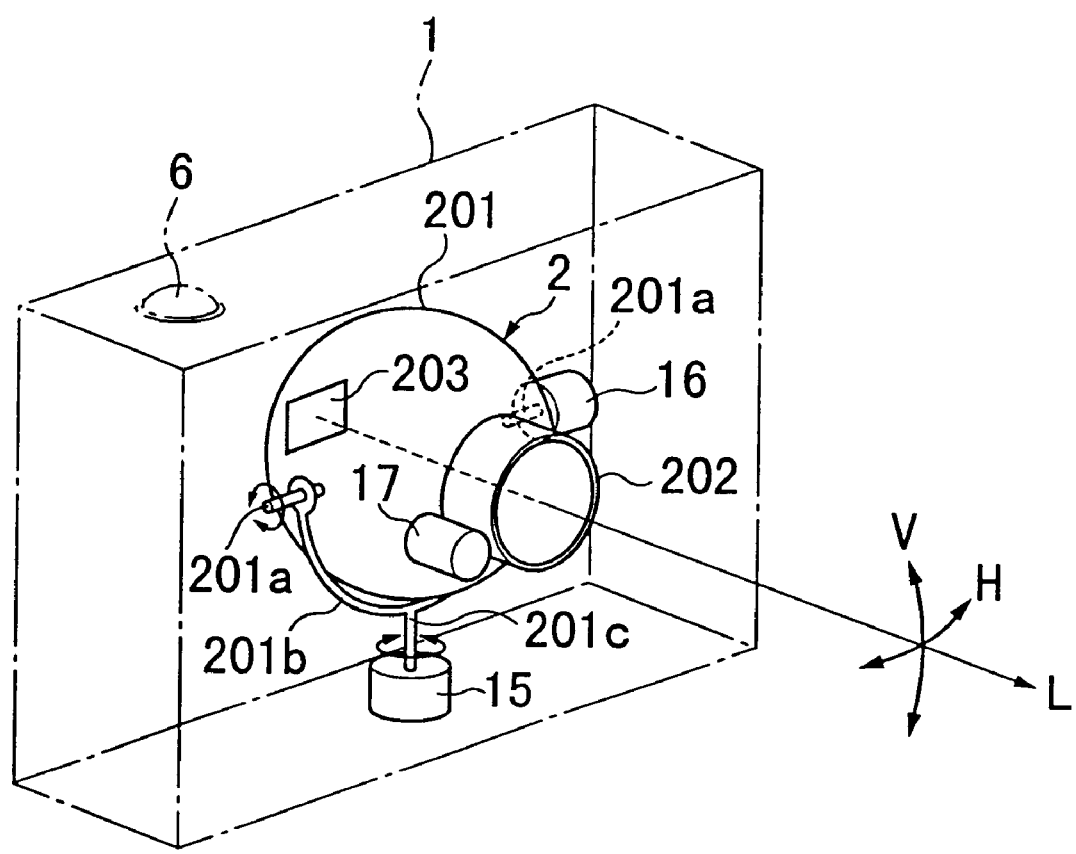
FIG. 3 is a schematic perspective view of an image sensing system of the electronic camera.

The image sensing unit 2 is, as shown in FIG. 3, comprised of a taking lens 202 including a zoom lens and projecting from the front surface of a container 201, and an image sensing element 203 such as a CCD area sensor arranged in a specified position on the optical axis L within the container 201. A pair of rotatable shafts 201a project from the opposite sides of the container 201 along a direction normal to the optical axis L, and are rotatably resting on the opposite ends of a U-shaped support frame 201b. A rotatable shaft 201c projects outward in the middle of the U-shaped support frame 201b, and the leading end of the rotatable shaft 201c is coupled with a rotor of an electric motor 15. Further, the leading end of one rotatable shaft 201a is coupled with a rotor of an electric motor 16.

The electric motor 15 is a drive source for rotating the container 201 in lateral directions (directions H in FIG. 3), and the electric motor 16 is a drive source for rotating the container 201 in vertical directions (directions V in FIG. 3). When the electric motor 15 is driven, the U-shaped support frame 201b coupled with the rotor thereof rotates along a horizontal plane, thereby rotating the container 201 such that the optical axis L changes in a horizontal plane. Further, when the electric motor 16 is driven, the rotatable shaft 201a coupled with the rotor rotates, thereby rotating the container 201 such that the optical axis L changes along a vertical plane.

An electric motor 17 is provided in a barrel of the taking lens 202 to drive the taking lens 202, thereby changing a zooming ratio.

This embodiment is constructed such that the taking lens 202 and the image sensing element 203 are paired to make the zooming ratio continuously changeable. However, it may have such a construction as to change the zooming ratio in a stepwise manner by changing a combination of a plurality of lenses and the image sensing element 203 by a prism, reflector or the like.

The light meter 3 includes a light receiving element such as an SPC for detecting the brightness of the object by receiving a light reflected by the object. The distance meter 4 detects a distance to the object by, e.g., an active metering method. The distance meter 4 includes a light emitting element for irradiating infrared rays toward the object and a light receiving element for receiving the infrared rays reflected by the object and is adapted to detect the distance from the camera to the object based on an angle at which the infrared rays are reflected by the object. Although the active metering method is adopted as a distance metering method in this embodiment, a passive metering method may be adopted.

A shutter button 6 is provided at a left end of the upper surface of the electronic camera 1. A switch for instructing a photographing preparation including focusing and setting of exposure control values is turned on, and for instructing an exposure operation is turned on when it is fully pressed. In a lower part of one side surface of the electronic camera 1 are provided a power switch 7 and a card insertion slot 8 through which a hard disk card 10 (hereinafter, "HD card 10") is inserted and detached. Above the card insertion slot 8 is provided a card eject button 9 for ejecting the HD card 10.

In the case that a photographed result is to be printed on a recording sheet, the HD card 10 is taken out of the electronic camera 1 by pushing the card eject button 9. If, for example, the HD card 10 is set in a printer compatible with the HD card 10, a data representing a photographed image is directly read from the HD card 10 to be printed on a recording sheet.

Alternatively, the electronic camera 1 may be provided with an interface for an SCSI cable and be connected with the printer via the SCSI cable, so that the data transferred from the electronic camera 1 to the printer can be printed on the recording sheet.

Although the HD card of the PCMCIA standards is used as a storage medium for the image data in this embodiment, a memory card, a mini-disk or other storage medium may be employed provided that it can store data representing photographed images.

A display section 11 comprised of a liquid crystal display (LCD) (hereinafter, "LCD section 11") is provided substantially in the middle of the rear surface of the electronic camera 1 as shown in FIG. 2. The LCD section 11 corresponds to an optical viewfinder.

When the electronic camera 1 is activated, the image sensing unit 2 picks up an image of an object, which is in turn displayed in the LCD section 11, so that a photographer can monitor an object image within a view frame. When the photographer pushed the shutter button 6 to perform a photographing operation, a photographed image obtained immediately after an exposure operation is displayed as a still image in the LCD section 11 while a still image is photographed. Accordingly, the photographer can monitor the photographed image (still image) in the LCD section 11.

The electronic camera 1 has a photographing mode in which an object image is photographed part by part while being divided into a plurality of parts (hereinafter, "partial images"), and then an image of the whole object (hereinafter, "whole image") having a high resolution is generated by pasting the partial images together by an image processing. Hereinafter, this photographing mode is referred to as a high resolution mode. In this mode as well, the whole object is first photographed and the photographed image (still image) is displayed in the LCD section 11, so that the photographer can promptly monitor the content of the image after the image combination.

On the left side of the LCD section 11 is provided a still image display cancel button 12. The cancel button 12 is an operation button for returning a display mode of the LCD section 11, which can be automatically changed from an animated image display to a still image display every photographing operation, from the still image display to the animated image display for a next photographing operation. The display mode is manually returned by the photographer in order to enhance the convenience of the photographed image monitoring without fixing a monitoring time. Alternatively, the cancel button 12 may be omitted by making the display mode automatically returnable from the still image display to the animated image display after the still image is displayed for a predetermined period.

At the bottom end of the rear surface of the electronic camera 1, a high resolution mode setting switch 13 is provided at a left end and a partial image number setting switch 14 is provided at a right end.

The switch 13 is operated to set the aforementioned high resolution mode. The high resolution mode is set when the switch 13 is set "ON", and a usual photographing mode is set when it is set "OFF".

Figure 4:
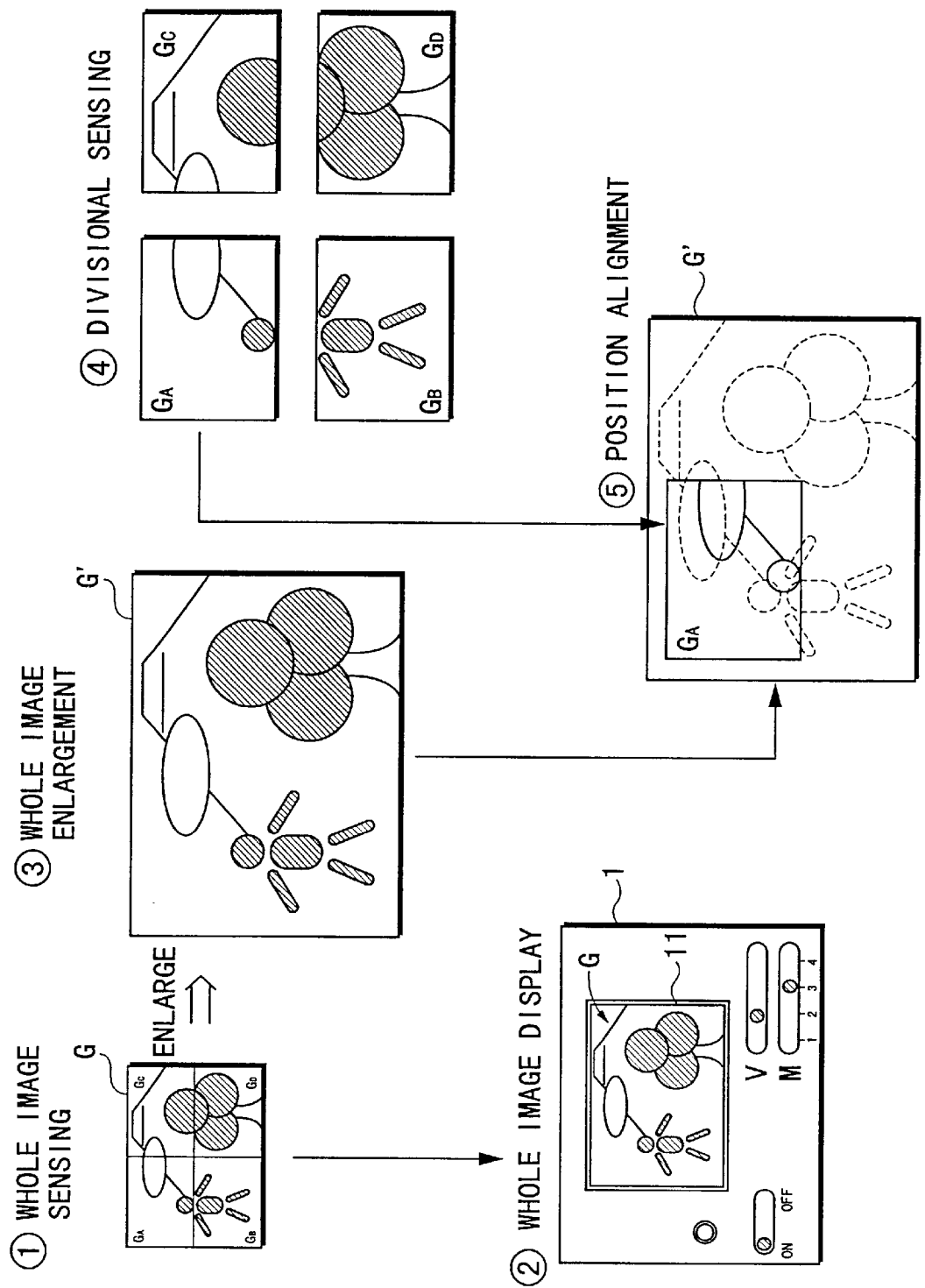
FIG. 4 is a diagram showing a photographing method in a high resolution mode.
Figure 5:
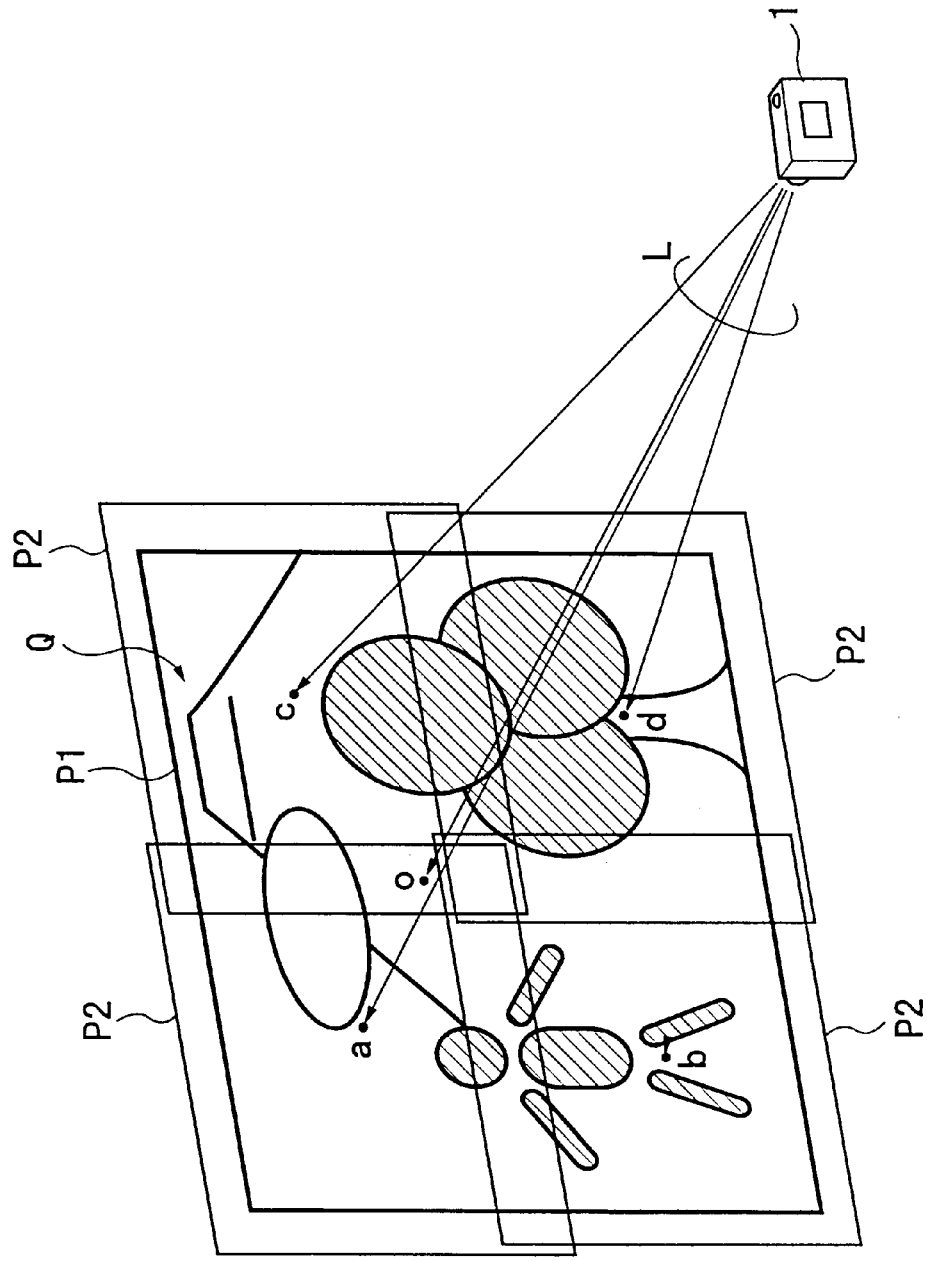
FIG. 5 is a diagram showing a relationship between an object and a photographic range during photographing in the high resolution mode.

In the high resolution mode, as shown in FIG. 4, a whole object is sensed by setting the optical axis L of the image sensing unit 2 to extend along front direction (see whole image sensing in FIG. 4) when the shutter button 6 is fully pressed. In other words, since the optical axis L of the image sensing unit 2 is initially set to extend along the front direction (direction o) as shown in FIG. 5, if the shutter button 6 is pressed after screen construction is adjusted such that a whole image of an object Q (landscape in FIG. 5) falls within a photographing frame P1, the whole image of the object Q is sensed.

This sensed image (hereinafter, this image is referred to as "pre-sensed image") is displayed as a still image in the LCD section 11 (see the whole image display in FIG. 4. Interpolation is applied to the pre-sensed image G, thereby generating an image G' enlarged fourfold (see whole image enlargement in FIG. 4). This enlarged image G' serves as a basis for an image distortion correction and an image combination of partial images $G_A$ to $G_D$, which are to be subsequently obtained by sensing the object part by part, when these partial images $G_A$ to $G_D$ are pasted together.

Accordingly, in the high resolution mode, the whole image to be finally combined immediately after shutter releasing is displayed in the LCD section 11, so that the whole image after the image combination can be promptly monitored.

Subsequently, partial images $G_A$ to $G_D$ obtained by dividing the whole object image into four images are successively sensed (sensing of the partial images) by changing the direction of the optical axis L of the image sensing unit 2 to specified directions other than the front direction and increasing the magnification to a specified value (twofold) (see divisional sensing in FIG. 4). Specifically, as shown in FIG. 5, an upper left portion of the object Q is sensed by changing the optical axis L of the image sensing unit 2 to a specified direction (direction a) so that the upper left portion of the object Q can be seen from the camera side, and increasing the magnification of the taking lens 202 about twofold so that about ¼ of the object image Q falls within a photographic frame P2. Thereafter, an upper right portion, a lower right portion and a lower left portion of the object Q are sensed by successively changing the direction of the optical axis L to specified directions so that the upper right, lower right and lower left portions of the object Q can be seen from the camera side (directions c, d, b). At this time, angles of view during the sensing of the partial images of the object Q are so set that boundary portions of the adjacent partial images overlap each other.

Thereafter, combination positions in the enlarged image G' and conversion amounts of the image data for the image distortion correction are calculated by comparing the partial images $G_A$ to $G_D$ with the enlarged image G' (see position alignment in FIG. 4). The whole image is generated by geometrically transforming the respective partial images $G_A$ to $G_D$ based on the transform amounts, and then pasting the partial images $G_A$ to $G_D$ after the image transformation at the boundary portions based on the combination positions. The thus generated whole image is stored in the HD card 10.

Although the enlarged image G' of the pre-sensed image G is used as a basis image for the combination positions, the pre-sensed image may be used as such a basis image and the combination positions may be calculated by comparing reduced images of the partial images $G_A$ to $G_D$ with the pre-sensed image G.

In FIG. 5, the photographic frame P2 is smaller than the photographic frame P1 since they are relatively drawn, centered on the object Q. Since the two frames P1, P2 are same in the sensing surface of the image sensing unit 2, the object Q is projected onto the sensing surface in smaller size with the scene construction of the photographic frame P1 than with that of the photographic frame P2. Accordingly, the pre-sensed image has a lower resolution than the partial images due to a relationship between the projected light image and the pixel density. Therefore, the resolution of the whole image obtained by combining the partial images is higher than that of the pre-sensed image.

On the other hand, in the normal photographing mode, when the shutter button 6 is pressed, image sensing is performed only once. After specified image processings (including γ-correction, white balance (WB) adjustment, outline correction, color nonuniformity correction suitable for the whole image) are applied to the sensed image, the resulting image is stored in the HD card 10. This image sensing is substantially equivalent to the storage of the pre-sensed image to which the specified image processings are applied in the high resolution mode. Accordingly, the photographed image in the usual photographing mode has a lower resolution than the photographed image (combined image) in the high resolution mode. In the example of FIG. 5, since the magnification of the partial images is about twice as large, the image photographed in the high resolution mode (combined image) has about four time as large a resolution as the image photographed in the usual photographing mode.

Referring back to FIG. 2, the partial image number setting switch 14 is a switch for setting the number of partial images (i.e., the number in which the object image is divided) in the high resolution mode. With the setting switch 14, a vertical column number n and a horizontal row number when the object is divided in (n×m) matrix can be set a maximum of 4. The setting switch 14 is comprised of a pair of four-contact switches 14a, 14b, and the column number n is set by the upper slide switch 14a and the row number m is set by the lower slide switch 14b.

Although the photographer can set the number of partial images in this embodiment, it may be fixedly set in advance, so that the setting switch 14 can be dispensed with.

Figure 6:
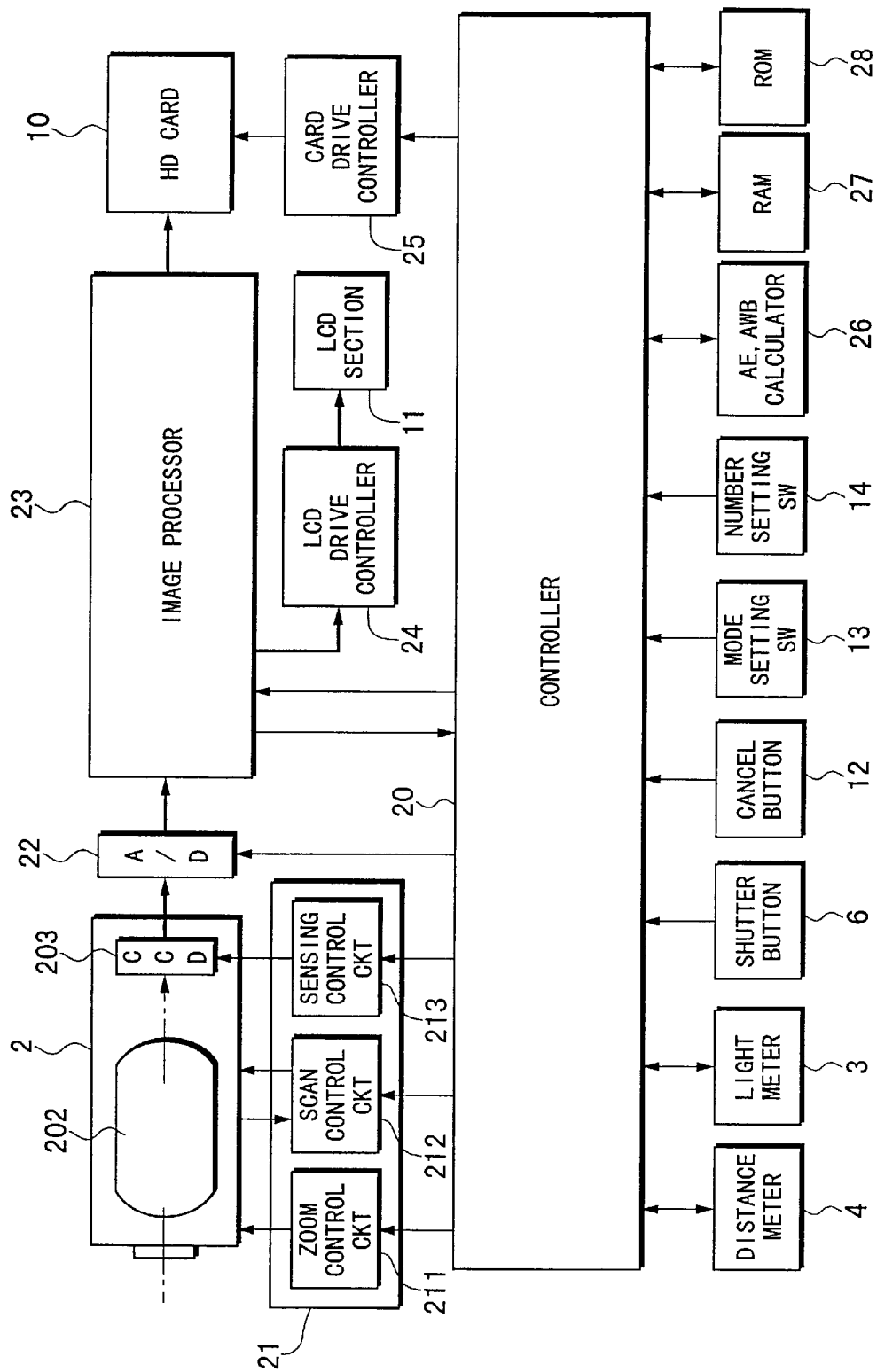
FIG. 6 is a block diagram showing a construction of the electronic camera.

FIG. 6 is a block diagram showing a construction of the electronic camera.

In FIG. 6, bold-line arrows show a flow of image data, whereas thin-line arrows show a flow of control data. The same elements as those shown in FIGS. 1 to 3 are identified by the same reference numerals.

A controller 20 is adapted to centrally control the photographing operation of the electronic camera 1 and comprised of a microcomputer. The controller 20 controls the drive of various members to be described later.

A sensing controller 21 controls the drive of the image sensing unit 2. The sensing controller 21 is provided with a zoom control circuit 211, a scan control circuit 212 and a sensing control circuit 213. The zoom control circuit 211 controls a zooming ratio (magnification) of the taking lens 202. The magnification is changed when the partial images are sensed in the high resolution mode, and set in accordance with the number of partial images (i.e., the number in which the object image is divided). An information on the number of partial images set by the setting switch 14 is inputted to the sensing controller 21 via the controller 20, and the zoom control circuit 211 sets a magnification corresponding to the inputted information and drives the electric motor 17 based on the set magnification so that the taking lens 202 attains a specified magnification.

The scan control circuit 212 controls the order of sensing the respective partial images in the high resolution mode, i.e., an operation of changing the direction of the optical axis L of the image sensing unit 2. The respective directions of the optical axis L (i.e. displacements along horizontal/vertical directions with respect to the front direction of the container 201) when the partial images are sensed are set in advance in accordance with the number of partial images (i.e., the dividing number of the object image). The order of sensing the respective partial images is also set in advance in accordance with the number of partial images (i.e., the dividing number of the object image). Although the direction of the optical axis L is changed in the order of a, c, d, b in the example of FIG. 5, the scanning direction is not limited to this. A desired scanning direction such as a-b-d-c or a-c-b-d can be employed. The scan control circuit 212 sets the direction of the optical axis L and the scanning direction with respect to the respective partial images based on the inputted information on the dividing number of the object image, and drives the electric motors 15, 16 based on the direction of the optical axis L to set a field of the image sensing unit 2 in a specified direction.

The sensing control circuit 213 controls the sensing (electric charge storing and electric charge reading) of the image sensing element 203 (hereinafter, "CCD 203"). The sensing control circuit 213 causes the CCD 203 to perform a video drive (repeat the sensing every 1/30 sec.) to obtain images to be displayed in a viewfinder. The sensing control circuit 213 causes the CCD 203 to perform the sensing only once in accordance with a photographing timing control signal sent from the controller 20 in the usual photographing mode, while causing it to continuously perform the sensing a specified number of times ((N+1) times for the dividing number N of the object image inputted from the controller 20) in accordance with the photographing timing control signal sent from the controller 20.

An analog-to-digital (A/D) converter 22 converts an image signal (analog signal) outputted from the image sensing unit 2 into, e.g., a 8-bit digital signal (hereinafter, this digital image signal is referred to as "image data").

An image processor 23 applies specified image processings including γ-correction, WHITE BALANCE adjustment and outline correction to the image data in the usual photographing mode. In the high resolution mode, the image processor 23 generates a whole image by pasting and combining image data of a plurality of partial images together while applying the above image processings. The image processings in the high resolution mode are described later.

An LCD drive controller 24 controls the drive of the LCD section 11 to display the photographed image for monitoring. Specifically, the controller 24 displays an image in the LCD section 11 by controlling the emission in the respective pixel positions of the LCD section 11 based on the image data inputted from the image processor 23. A card drive controller 25 controls the drive of the HD card 10 when the image data is stored.

An AE.AWB calculator 26 calculates an exposure control values and a white balance adjustment value when the partial images are sensed in the high resolution mode. Specifically, the calculator 26 extracts the image data in a partial sensing area from the image data of the pre-sensed image obtained in the high resolution mode and calculates the exposure control values and the white balance adjustment value when the corresponding partial image is sensed using the extracted image data.

A random access memory (RAM) 27 is a memory for the calculation of the controller 20 concerning the photographing. A read only memory (ROM) 28 is a memory for storing a processing program for a photographing control, data necessary for the drive control of the image sensing unit 2, and a variety of data and processing programs necessary for the image processings in the high resolution mode to be described later.

Figure 7:
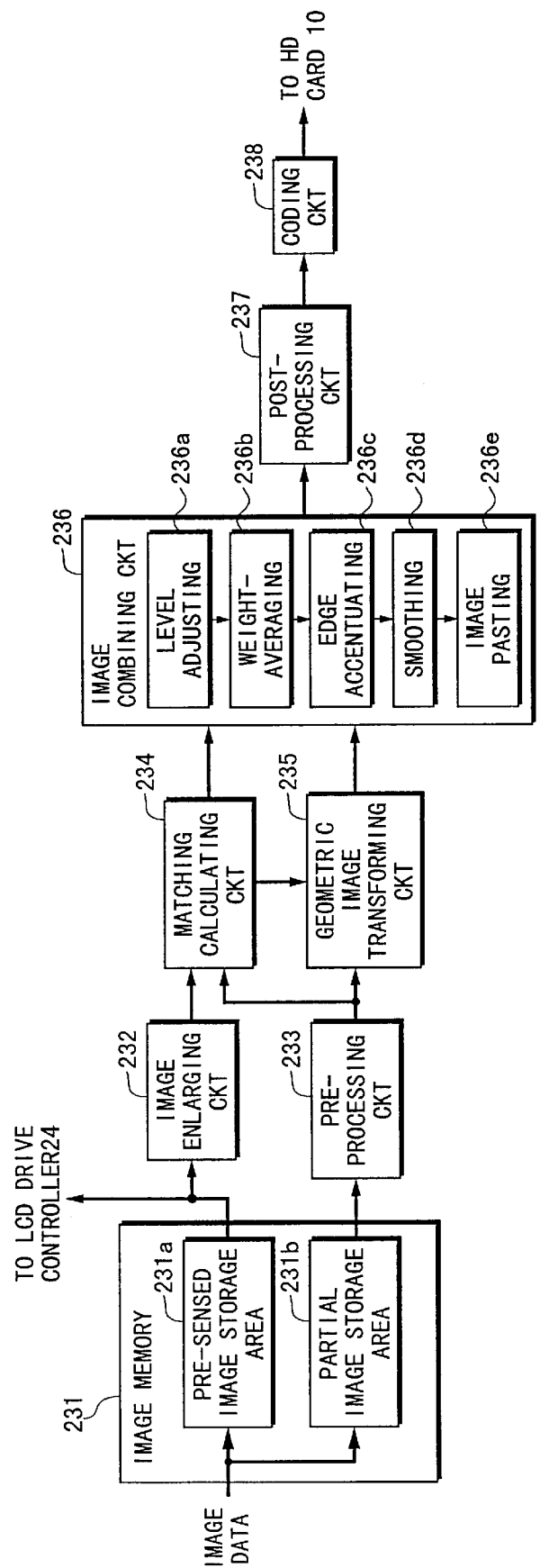
FIG. 7 is a block diagram showing a construction of a first image processor relating to the image processing in the high resolution mode.

FIG. 7 is a block diagram showing a construction of the image processor 23 for the image processings in the high resolution mode.

In FIG. 7, bold-line arrows show a flow of the image data. An image memory 231 is a memory for storing an image data inputted from the A/D converter 22. The image memory 231 is comprised of a RAM and has a pre-sensed image storage area 231a and a partial image storage area 231b.

In the pre-sensed image storage area 231a is stored the image data of the pre-sensed image. In the usual photographing mode, the image data of the photographed image is also stored in the pre-sensed image storage area 231a. The photographed image in the usual photographing mode or the pre-sensed image in the high resolution mode, which is stored in the pre-sensed image storage area 231a, is transferred to the LCD drive controller 24 and displayed in the LCD section 11 (in an animated (movie video) manner or a stationary (still) manner). In the partial image storage area 231b is stored the image data of the partial images.

An image enlarging circuit 232 enlarges the pre-sensed image substantially at the same magnification as the one at which the partial images are sensed, thereby generating an enlarged image. In other words, the image enlarging circuit 232 generates the enlarged image G' by enlarging the pre-sensed image G about four times as large, for example, in the example of FIG. 4 and transfers it to a matching calculating circuit 234.

A pre-processing circuit 233 applies necessary processings to the respective partial images before they are pasted and combined together. The pre-processings include a brightness correction, noise removal, smoothing and edge enhancement. The pre-processings for the respective partial images are applied in order to facilitate the determination of the combination positions by correcting a brightness difference, a displacement of outline, etc. between the enlarged image and the partial images. The pre-processing circuit 233 successively reads the respective partial images from the partial image storage areas 231b, and transfers them to the matching calculating circuit 234 after applying the specified pre-processings such as the aforementioned brightness correction.

The matching calculating circuit 234 calculates a transform amount (hereinafter, "matching transform amount") of the image data when the respective partial images are geometrically transformed, so that the respective partial images substantially correspond with parts of the images in corresponding positions of the enlarged image.

Figure 8:
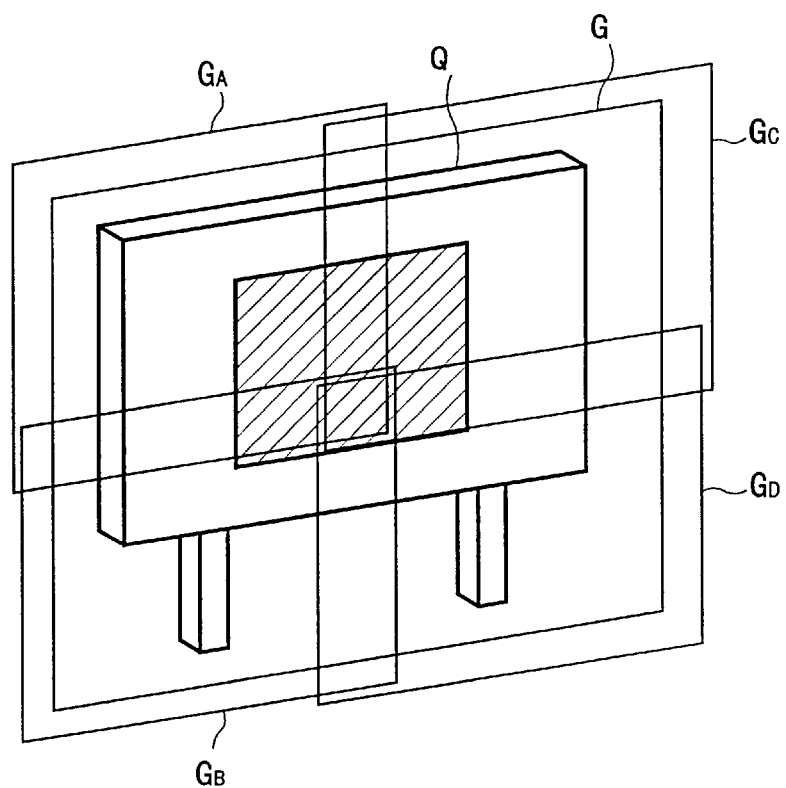
FIG. 8 is a perspective diagram showing photographing ranges for the respective photographing modes when a bulletin is sensed part by part while being divided into four parts.
Figure 9:
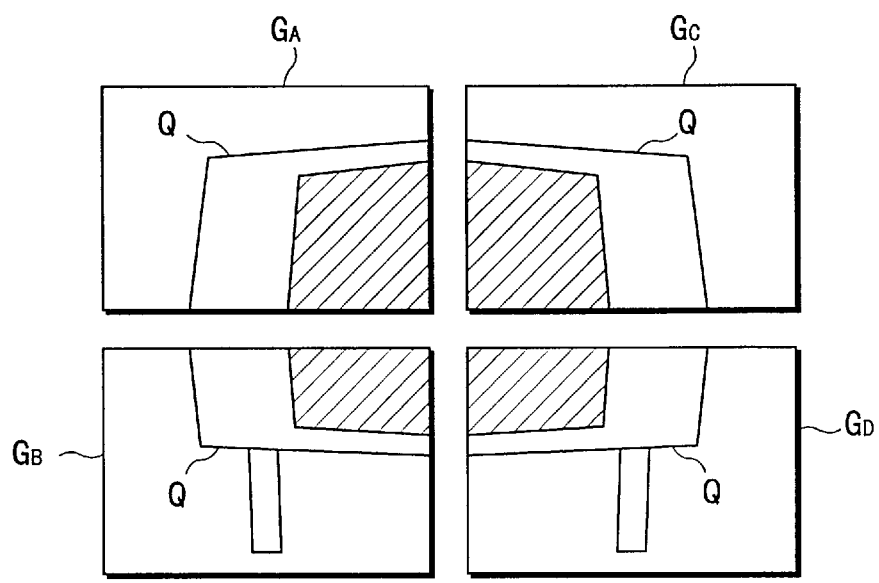
FIG. 9 is a diagram showing a perspective image distortion occurred in partial images.

In this embodiment, since parts of the object are sensed by changing the direction of the optical axis L of the image sensing unit 2, there is a likelihood of a brightness difference between the partial images due to differences in the exposure control values and the white balance adjustment values used when the respective partial images are sensed. Further, since the optical axis L is oblique to the parts of the object to be sensed, the respective partial images sensed have a perspective image distortion. In other words, in the case that a bulletin board Q as an object is photographed while being divided into four partial images $G_A$ to $G_D$ as shown in FIG. 8, the respective partial images has a perspective image distortion as shown in FIG. 9.

Figure 10:
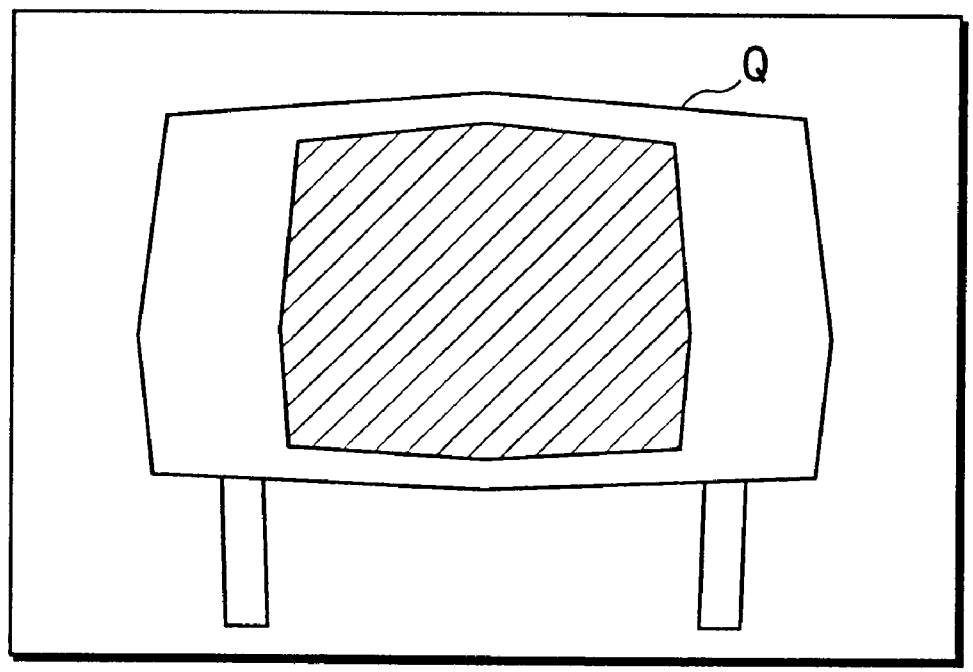
FIG. 10 is a diagram showing an image obtained by pasting the partial images having a perspective image distortion together.

The respective partial images may be pasted and combined at the boundary portions by correcting only the brightness differences between the partial images. However, if the partial images are simply pasted and combined, the perspective image distortions of the respective partial images are seen in the whole image obtained after the image combination as shown in FIG. 10. In a worse case, patterns may be bent or displaced at the boundary portions. Thus, such a simple combination results in a considerably reduced image quality. In order to suppress such a problem, a method for correcting the perspective image distortions of the partial images based on the displacement of the optical axis L and the object distance may be employed. However, this method newly necessitates circuits and processings for correcting the image distortions of the partial images, making the apparatus more complicated, larger and more expensive.

In this embodiment, the combination positions are determined by geometrically transforming the respective partial images based on the pre-sensed image and the perspective image distortions are corrected. In this way, the reduction in quality of the combined whole image is suppressed without making the apparatus more complicated, larger and more expensive. Accordingly, the matching calculating circuit 234 calculates, for each partial image, the transform amount of the image data for coinciding the partial image with the image in the corresponding position of the enlarged image, and the calculation result is sent to a geometric image transforming circuit 235 and an image combining circuit 236.

Figure 11:
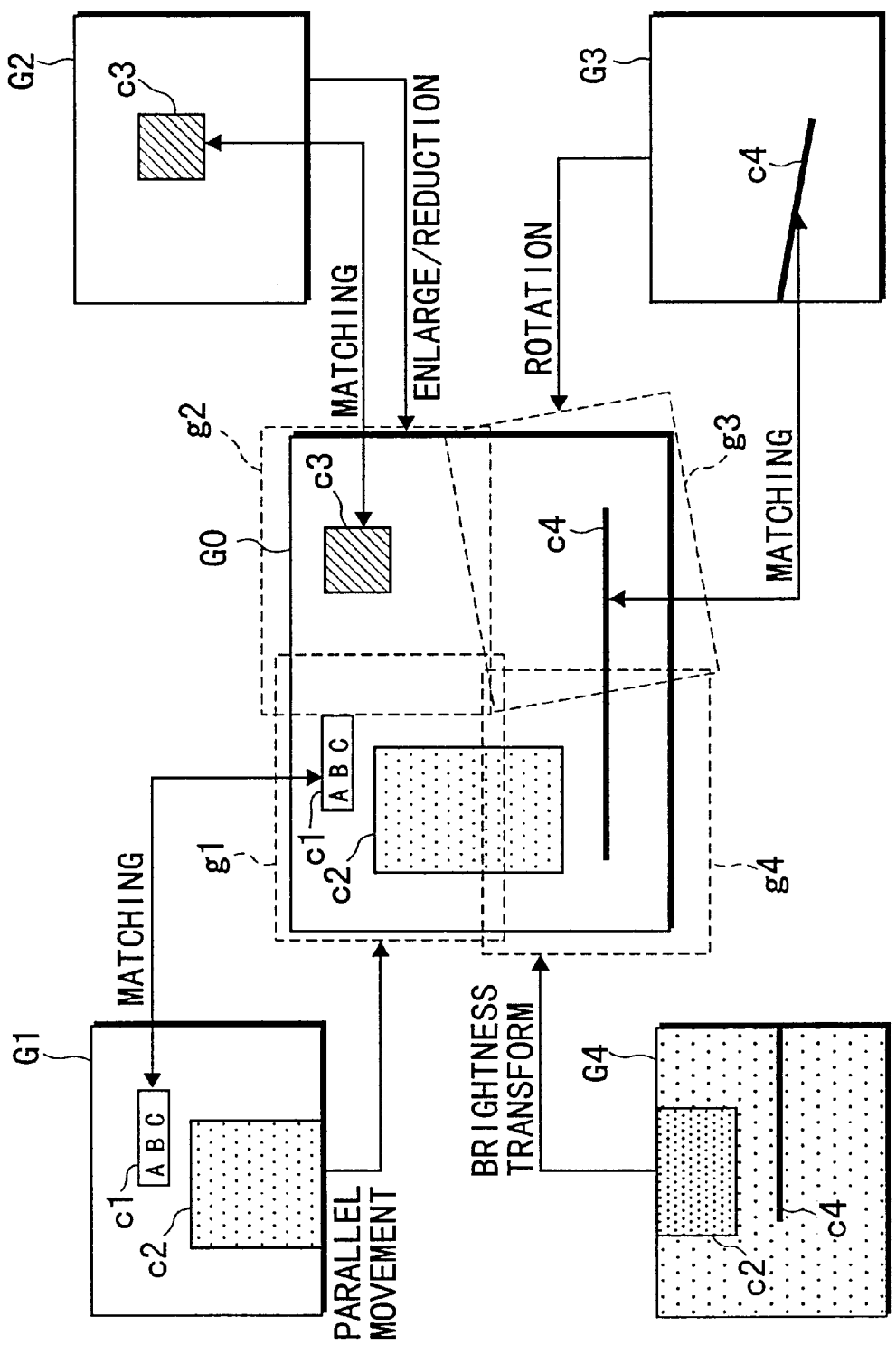
FIG. 11 is a diagram showing a matching method.

The matching calculating circuit 234 extracts or samples, for example, a plurality of characteristic points within the enlarged image, compares the partial images with the enlarged image while performing geometric transforms such as parallel movement, rotation, and enlargement/reduction as shown in FIG. 11, and calculates a geometric transform amount where the characteristic points overlap to a maximum degree. In the positions where the degree of correspondence of the partial image with the enlarged image is highest, the respective partial images are arranged and combined by pasting the boundary portions together. Therefore, the geometric transform amounts also serve as an information on the combination positions in the combination of the partial images.

The characteristic points are image data in an area having a characteristic image information such as a specific character or sequence of characters, a specific geometric shape (e.g., triangle, circle, and ellipse), or a specific edge. The character or sequence of characters as a characteristic point is extracted by a known character recognition method; the geometric shape as a characteristic point is extracted by a known texture analysis; and the edge as a characteristic point is extracted by a known edge detection method.

In FIG. 11, g1, g2, g3, g4 denote matching positions of partial images G1, G2, G3, G4 on the upper left, upper right, lower right and lower left sides in an enlarged image G0. For the partial image G1 on the upper left side, the matching position g1 is calculated by a parallel movement method with a character sequence c1 of "ABC" or a rectangular c2 as a characteristic point. For the partial image G2 on the upper right side, the matching position g2 is calculated by an enlargement/reduction method with a square c3 as a characteristic point. For the partial image G3 on the lower right side, the matching position g3 is calculated by a rotation method with a bold line c4 or an edge of the bold line c4 as a characteristic point. For the partial image G4 on the lower left side, the matching position g4 is calculated by a brightness transform method with the rectangle c2 or the bold line c4 as a characteristic point.

Figure 12A:
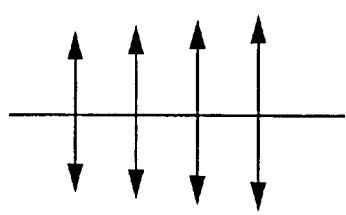
Figure 12B:
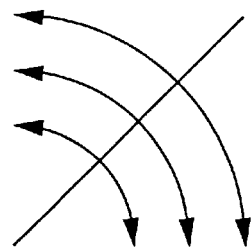

Parameters of the geometric transform amount differ depending on the matching method: a parallel movement amount in the parallel movement method, and a center of rotation and an angle of rotation in the rotation method. In the enlargement/reduction method, a center position and a magnification in the case of enlargement/reduction about a point, whereas a position of axis, enlarging/reducing direction and a magnification in the case of enlargement/reduction along straight lines normal to an axis or along arcs extending from the axis as shown in FIGS. 12A and 12B.

Further, the overlapping degree of the characteristic points is discriminated using a correspondence value between the image data of the characteristic points of the pre-sensed image and the image data of the geometrically transformed partial image in the pixel positions corresponding to the characteristic points, and/or a sum of absolute values of differences between the above two image data or a sum of squares of such differences.

If the partial images are geometrically transformed to be enlarged or reduced, there are displacements between the pixel positions after the transformation and those of the enlarged image. Accordingly, it is preferred that the image data of the geometrically transformed partial images corresponding to the pixel positions for the characteristic points of the enlarged image be corrected by the nearest neighbor method, cubic convolution method or like interpolation method. Although the overlapping degree is discriminated using the image data near the characteristic points in this embodiment, it may be discriminated for the entire partial image to improve the image quality. In such a case, a reduction in processing speed may be suppressed by using an image data having a reduced number of pixels by weeding out the image data every block or every several pixels.

The geometric image transforming circuit 235 is adapted to geometrically transform the respective partial images based on the geometric transform amounts calculated by the matching calculating circuit 234. Specifically, the circuit 235 converts the addresses of the image data of the respective partial images by a specified transformation using the geometric transform amounts.

The image combining circuit 236 is adapted to combine a plurality of geometrically transformed partial images in such a manner as to paste them together at the overlapping boundary portions. The circuit 236 generates an image of the boundary portion to be combined using the image data at the overlapping boundary portions of the adjacent partial images, and combines the two partial images by pasting the image in the boundary portion to be combined and the images of the partial images except the boundary portions together.

If the boundary portions of the adjacent geometrically transformed partial images are identical, the two partial images can be easily combined by pasting them together without generating the image of the boundary portion to be combined. However, in the case that the rotation causes a displacement of less than 1 pixel at the boundary portions of the adjacent partial images or in the case that a difference in photographing conditions causes a difference in brightness distribution, the two partial images cannot be matched (density distribution matching and shape matching) if they are simply pasted together. Accordingly, it is necessary to generate images for the image combination using the image data of the boundary portions of the two partial images, so that a density variation and a shape displacement at the boundary portions would not look unnatural.

Figure 13A:
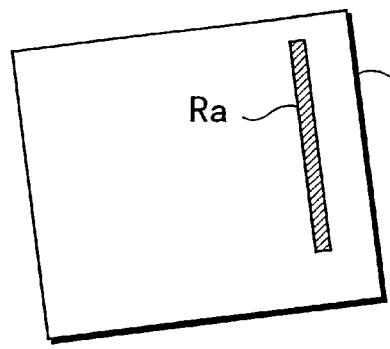
Figure 13B:
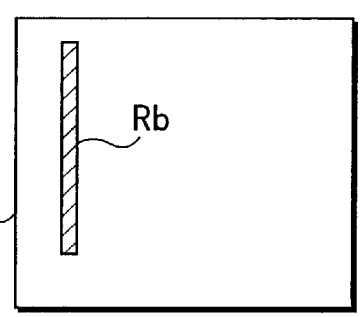
Figure 13C:
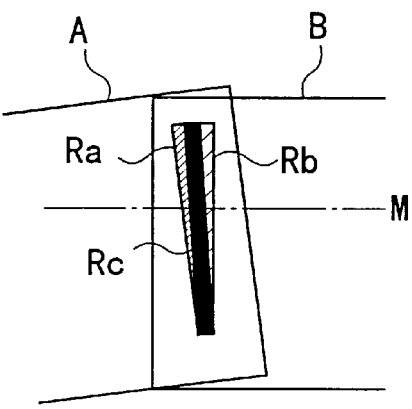

FIGS. 13A to 13C show an example of the combining method in the case that a brightness level difference and a pattern displacement are seen at the boundary portions, wherein FIG. 13A shows a left partial image, FIG. 13B shows a right partial image and FIG. 13C shows an image obtained by superimposing the left and right partial images at the boundary portion.

The boundary portions of left and right partial images A, B contain strip-like shapes Ra, Rb. The strip-like shape Ra is slightly inclined toward the left with respect to the strip-like shape Rb and has a slightly higher density than the strip-like shape Rb. In the case of combining the left and right partial images A, B by pasting them at the boundary portions, it is preferable that a strip-shape Rc obtained by the image combination be generated in the middle between the strip-like shapes Ra, Rb as shown in FIG. 13C.

Figure 14:
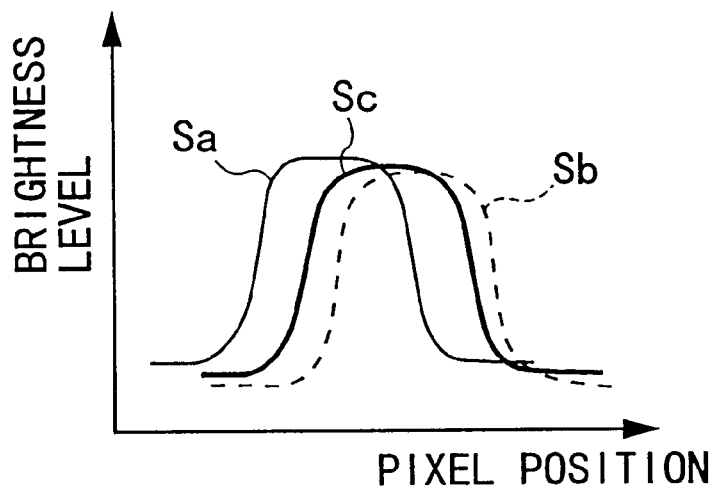
FIG. 14 is a graph showing a waveform of an image data sequence representing an ideal strip-shape Rc obtained by properly combining an image data representing a strip-shape Ra and an image data representing a strip-shape Rb on a straight line M of FIG. 13C.

FIG. 14 is a waveform chart of a signal representing an image data sequence of an ideal strip-shape Rc after the image combination on a straight line M of FIG. 13C. In FIG. 14, a wave Sa indicated in solid line is a wave of a signal representing an image data sequence of the strip-like shape Ra and a wave Sb indicated in broken line is a wave of a signal representing an image data of the strip-like shape Rb. A wave Sc indicated in bold line is a wave of a signal representing an image data sequence of the ideal strip-like shape Rc after the image combination.

As shown in FIG. 14, the ideal signal Sc is located in an intermediate position between the signals Sa and Sb, and its level at its peak and its width substantially correspond with those of the signals Sa, Sb.

The following known method may be employed in the case that an image data of the boundary portion to be combined is generated using the image data of the boundary portion of the left partial image A and that of the boundary portion of the right partial image B. The image data of the two partial images A, B are averaged with weight factors for linearly increasing a ratio of the image data of the left partial image A at the left side of the boundary portion to be combined while linearly increasing a ratio of the image data of the right partial image B at the right side of the boundary portion to be combined.

Figure 16:
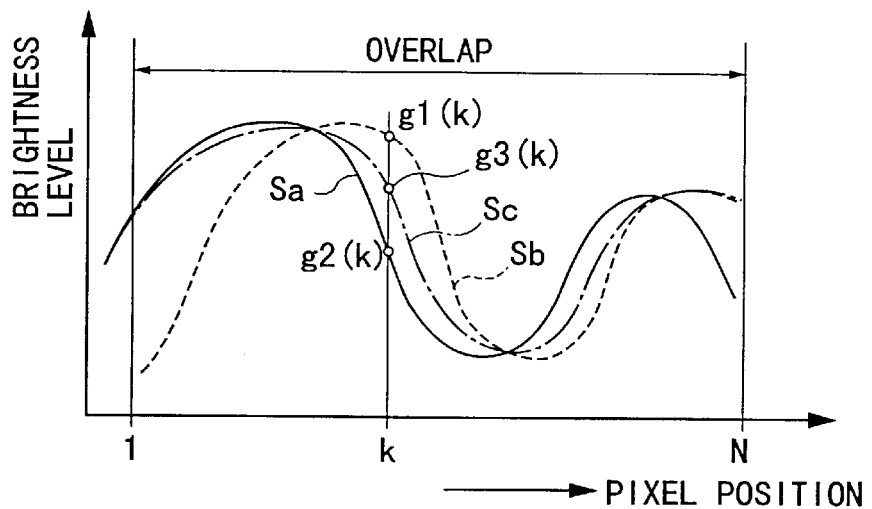
FIG. 16 is a waveform chart showing a method for combining images by the linear weighted-averaging.

This linear averaging with weight factors determines an image data g3(k) in pixel position k of the image of the boundary portion to be combined by, for example, the following equations, if N denotes a total number of pixels in the overlapping boundary portion and 1, 2, . . . N denote addresses of the respective pixels from the left end of the boundary portion to the right as shown in FIG. 16.

$$g3(k) = \{k \cdot g2(k) + (N-k) \cdot g1(k)\}/N$$

where g1(k): image data in pixel position k of the boundary portion of the left partial image A g2(k): image data in pixel position k of the boundary portion of the right partial image B.

In the above equation, a weight factor of the image data g1(k) is set at distance k from the left end of the left partial image A, and that of the image data g2(k) is set at distance (N−k) from the right end of the right partial image B.

Figure 15:
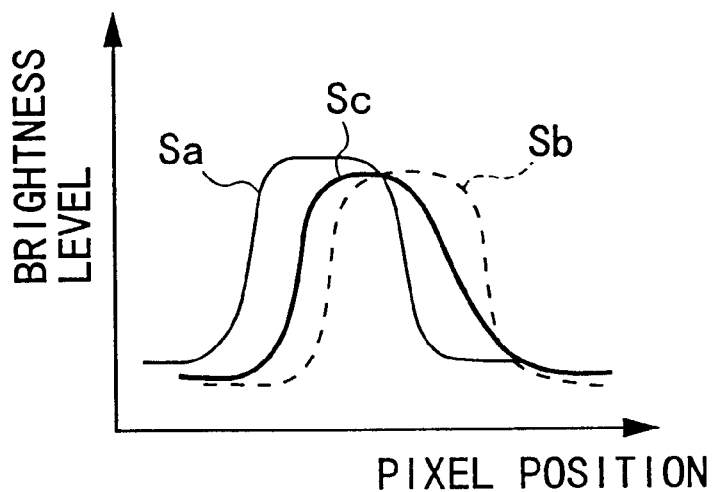
FIG. 15 is a graph showing a waveform of an image data sequence representing an ideal strip-shape Rc obtained by linearly weighted-averaging the image data representing the strip-shape Ra and the image data representing the strip-shape Rb on the straight line M of FIG. 13C.

FIG. 15 is a waveform chart of a signal representing an image data sequence of the ideal strip-shape Rc generated by applying linear averaging with weight factors to the signals Sa, Sb of FIG. 13C. The wave Sa indicated in solid line is a wave of the signal representing the image data sequence of the strip-like shape Ra and the wave Sb indicated in broken line is a wave of the signal representing the image data of the strip-like shape Rb. The wave Sc indicated in bold line is a wave of a signal representing an image data sequence of the ideal strip-like shape Rc generated by applying linear averaging with weight factors.

The averaging with weight factors is applied to generate an image data of the boundary portion to be combined such that a density difference of the two images at the boundary portion is smoothed when the left and right partial images A, B are pasted together at their boundary portions. If a brightness difference between the left and right partial images A, B is large, the signal Sc representing the image data sequence of the strip-like shape Rc included in the boundary portion to be combined has a reduced level than the ideal signal (see FIG. 14) and the waveform thereof is largely diverted by being influenced by the right partial image B having a lower brightness. Particularly, if a dimension of the overlapping boundary portions of the left and right partial images A, B is sufficiently larger than a pixel interval, an image data in a middle portion of the image of the boundary portion after the image combination is substantially equivalent to a component ratio of the image data of the partial image A to those of the partial image B (i.e., becomes a simple average value of the two image data). Thus, the waveform of the signal Sc representing the image data sequence of the strip-like shape Rc is flattened, thereby disadvantageously lowering the density of the strip-like shape Rc.

In view of the above, in this embodiment, a reduction in density and a change in shape of the strip-like shape Rc after the image combination are suppressed by applying both edge enhancement and smoothing when the image of the boundary portion to be combined is generated. Accordingly, the image combining circuit 236 is provided with a level adjusting circuit 236a, a weighted-averaging circuit 236b, an edge enhancing circuit 236c, a smoothing circuit 236d and an image pasting circuit 236e so as to generate an image of the boundary portion to be combined by applying both edge enhancement and smoothing.

Figure 17A:
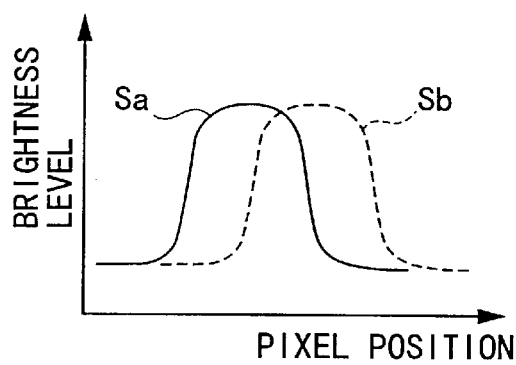
Figure 17B:
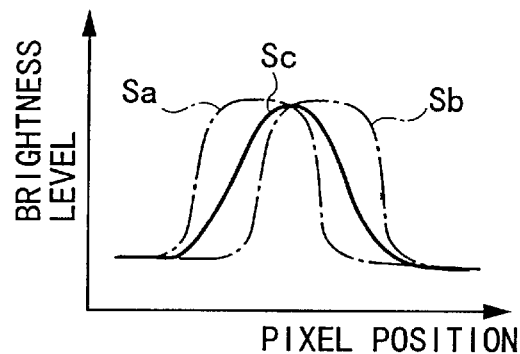
Figure 17C:
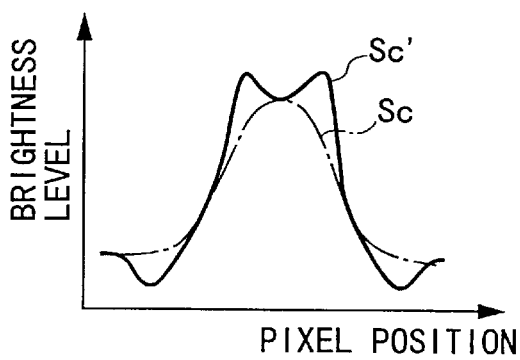
Figure 17D:
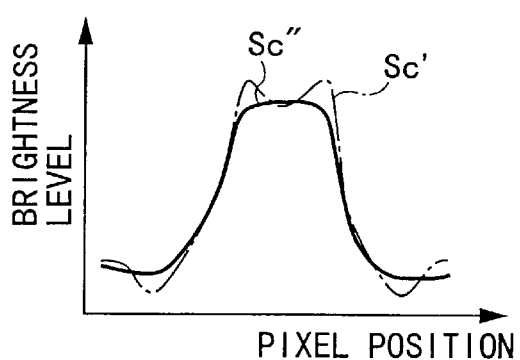

FIGS. 17A to 17D are waveform charts used to describe the generation of the image of the boundary portion to be combined by applying both the edge enhancement and smoothing and show waveforms of various signals in the generation of the image of the boundary portion to be combined in the case of FIG. 13C. Specifically, FIG. 17A is a waveform chart of the signal Sa representing the image data sequence of the strip-shape Ra and the signal Sb representing the image data sequence of the strip-like shape Rb after level adjustment; FIG. 17B is a waveform chart showing the signal Sc obtained by applying averaging with weight factors to the level-adjusted signals Sa, Sb; FIG. 17C is a waveform chart of a signal Sc' obtained by enhancing the edge of the signal Sc; and FIG. 17D is a waveform chart of a signal Sc" obtained by smoothing the bulging edge of the signal Sc'.

In generating the image of the boundary portion to be combined, the image combining circuit 236 first adjusts the levels of the signal Sa representing the image data sequence of the strip-shape Ra and of the signal Sb representing the image data sequence of the strip-shape Rb (see state of FIG. 17A). Specifically, a level average value Va of an image data group of the boundary portion of the left partial image A and a level average value Vb of an image data group of the boundary portion of the right partial image B are calculated, and an average value Vab of the level average values Va, vb is further calculated (Vab=(Va+Vb)/2). The level of the signal Sa is reduced as a whole by subtracting a correction value ΔVa (=|Vab−Va|) from the level values of the respective image data of the boundary portion of the left partial image A. On the other hand, the level of the signal Sb is increased as a whole by adding a correction value ΔVb (=|Vab−Vb|) to the level values of the respective image data of the boundary portion of the right partial image B. In this way, the two signals Sa, Sb have their levels adjusted.

Subsequently, the weighted-averaging circuit 236b generates the image of the boundary portion to be combined (hereinafter, "boundary image to be combined") by applying the aforementioned averaging with weight factors using the image data of the boundary portion of the left partial image A and the image data of the boundary portion of the right partial image B after the level adjustment. By this averaging, the strip-like shape Rc having the waveform Sc of FIG. 17B is generated in the boundary image to be combined.

Subsequently, the edge enhancing circuit 236c enhances the edges by performing a calculation of f(i,j)−∇²f(i,j), assuming that f(i,j) denotes a function representing the boundary image to be combined. Specifically, filtering is applied to the image data of the boundary image to be combined to enhance the edges using, for example, a Laplacian filter as shown in FIG. 18. The filtering replaces an image data g(i,j) in pixel position (i,j) (i=1, 2, . . . n, j=1, 2, . . . m) by an image data g(i,j)'={4g(i,j)−g(i−1, j)−g(i, j−1)−g(i, j+1)−g(i+1, j)}/4 if the boundary image to be combined is assumed to be n×m image data. This filter changes the waveform of the signal Sc representing the image data sequence of the strip-like shape Rc included in the boundary image to be combined to the signal Sc' shown in FIG. 17C.

Although the Laplacian filter of 3×3 size is used in this embodiment, those of other sizes may be used. Further, not only Laplacian filters, but wide-range enhancement filters having a factor approximate to a Laplacian factor and capable of enhancing the edges may be used.

Subsequently, the smoothing circuit 236d applies smoothing to the boundary image to be combined having their edges enhanced. Specifically, such filtering as to smooth two peaks created at the opposite ends of the peak of the signal Sc' and two valleys created on the foot of the signal Sc' by the edge enhancement is applied to the image data of the boundary image to be combined using, for example, a smoothing filter shown in FIG. 19. By this filtering, the image data g i,j) of the boundary image to be combined is replaced by an image data g(i,j)" calculated by the following equation.

$$g(i,j)'' = g(i,j)/4 + \{g(i-1,j) + g(i,j-1) + g(i,j+1) + g(i+1,j)\}/8 + \{g(i-1,j-1) + g(i-1,j+1) + g(i+1,j-1) + g(i+1,j+1)\}/16$$

The waveform of the signal Sc' representing the image data sequence of the strip-like shape Rc included in the boundary image to be combined is changed into that of the signal Sc" of FIG. 17D by this filtering.

Although the smoothing filter of 3×3 size is used in this embodiment, those of other sizes may be used. Further, the smoothing filter is not limited to the one shown in FIG. 19, but may be, for example, such as to simply average the image data of neighboring pixels.

If the aforementioned edge enhancement and smoothing are applied to the signal Sc representing the image data of the strip-like shape Rc generated by the linear averaging with weight factors, the waveform of the signal Sc changes as shown in FIGS. 17C and 17D, with the result that the signal Sc" approximate to the signal Sc having an ideal waveform shown in FIG. 14 can be obtained.

However, since the edge enhancement and smoothing are adapted to shape the waveform of the signal Sc representing the image data sequence of the strip-like shape Rc generated by the linear averaging with factors into an ideal waveform, the waveform of the signal Sc" after shaping is largely influenced by that of the original signal Sc. The waveform of the signal Sc largely changes depending on the degree of displacement between the waveform of the signal Sa representing the image data sequence of the strip-like shape Ra and that of the signal Sb representing the image data sequence of the strip-like shape Rb. Consequently, the waveform of the signal Sc" largely changes depending of the degree of displacement between the signals Sa and Sb.

Figure 20A:
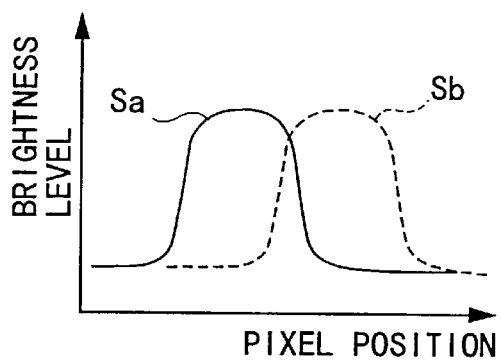
Figure 20B:
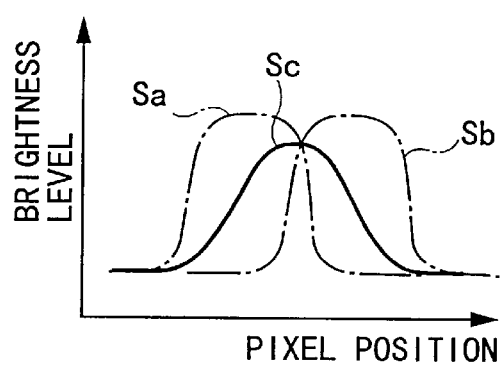
Figure 21A:
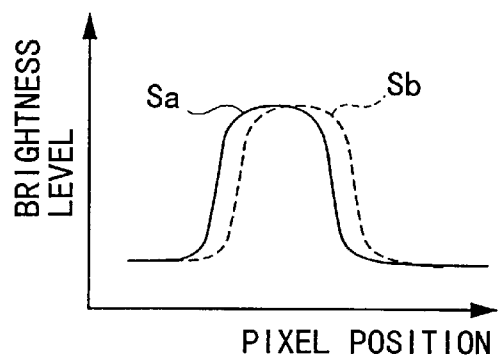
Figure 21B:
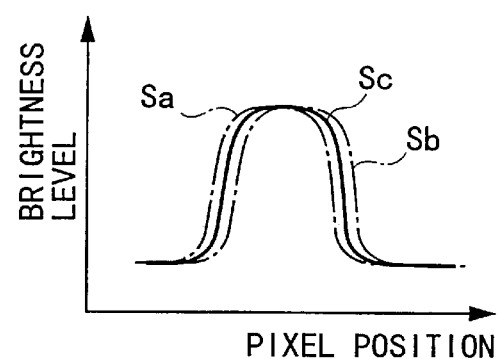

Particularly, if the waveforms of the signals Sa, Sb are away from each other (i.e., there is a large displacement between the left and right partial images A, B), the peak level of the signals Sc comprised of the image data sequence of the strip-like shape Rc generated by the linear averaging with weight factors falls, flattening the waveform of the signal Sc as shown in FIGS. 20A and 20B. On the other hand, if the waveforms of the signals Sa, Sb are close to each other (i.e., there is a small displacement between the left and right partial images A, B), the peak level of the signals Sc is substantially the same as the signal Sa (or signal Sb) and the waveform thereof is rectangular similar to the signal Sa in FIGS. 21A and 21B.

In order to reduce the influence of the displacement between the left and right partial images A, B in the waveform shaping by the edge enhancement and smoothing, a second derivative ∇²g3(i,j) added to the image data g3(i,j) in pixel position (i,j) after the averaging with weight factors may be changed, for example, in each pixel position, according to a level difference $\Delta g$ $(=|g1(i,j)-g2(i,j)|)$ between the image data $g1(i,j)$ of the left partial image A and the image data $g2(i,j)$ of the right partial image B in pixel position $(i,j)$. Specifically, if the level difference $\Delta g$ is 0 or very small, the second derivative $\nabla^2 g3(i,j)$ is set at 0 or a very small value. The second derivative $\nabla^2 g3(i,j)$ is increased as the level difference $\Delta g$ becomes larger.

Figure 20C:
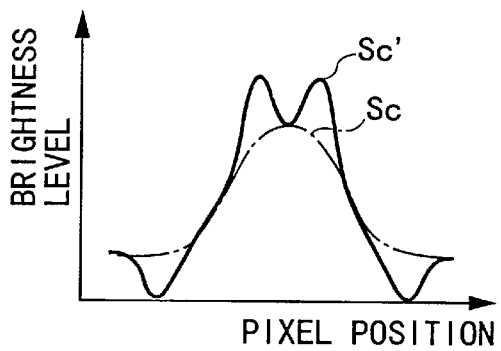
Figure 20D:
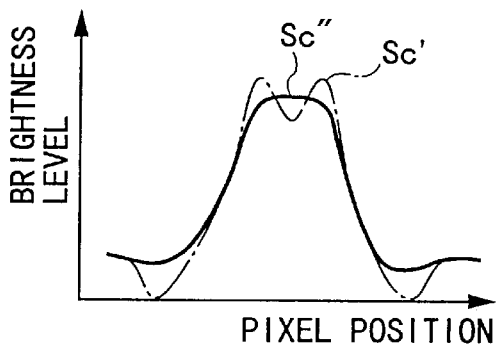
Figure 21C:
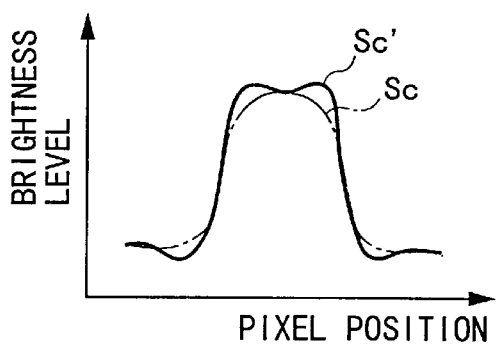
Figure 21D:
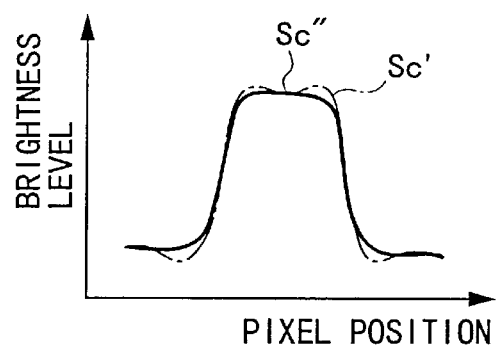

With the above processing, if the waveforms of the signals Sa, Sb are away from each other (i.e., there is a large displacement between the left and right partial images A, B), the projecting lengths of the edges at the opposite ends of the peak of the signal Sc' and the fallen lengths of the valleys on the foot of the signal Sc caused by the edge enhancement are longer as shown in FIG. 20C. Further, if the waveforms of the signals Sa, Sb are close to each other (i.e., there is a small displacement between the left and right partial images A, B), the projecting lengths of the edges at the opposite ends of the peak of the signal Sc' and the fallen lengths of the valleys on the foot of the signal Sc caused by the edge enhancement are shorter as shown in FIG. 21C and the waveform and peak level of the signal Sc" can be substantially ideally set (state of the signal Sc shown in FIG. 17).

A control for changing the second derivative $\nabla^2 g3(i,j)$ may be performed in each pixel position as described above or may be performed in the unit of blocks comprised of a specified number of pixels. Although the above description is given on the case where the left and right partial images A, B are pasted together, the image combination can be performed by a similar method in the case that upper and lower partial images are pasted together.

Referring back to FIG. 7, a post-processing circuit 237 applies corrections such as edge enhancement, smoothing and color nonuniformity correction to the entire combined image generated by the image combining circuit 236. A coding circuit 238 codes image data of the entire image combined. The coding circuit 238 codes (compresses) the image data by, for example, the JPEG compression method which is a combination of the discrete cosine transform (DCT) and Huffman coding. The image data outputted from the coding circuit 238 is stored in the HD card 10.

Next, the photographing operation of the electronic camera 1 is described with reference to a flowchart of FIGS. 22 to 24.

Figure 22:
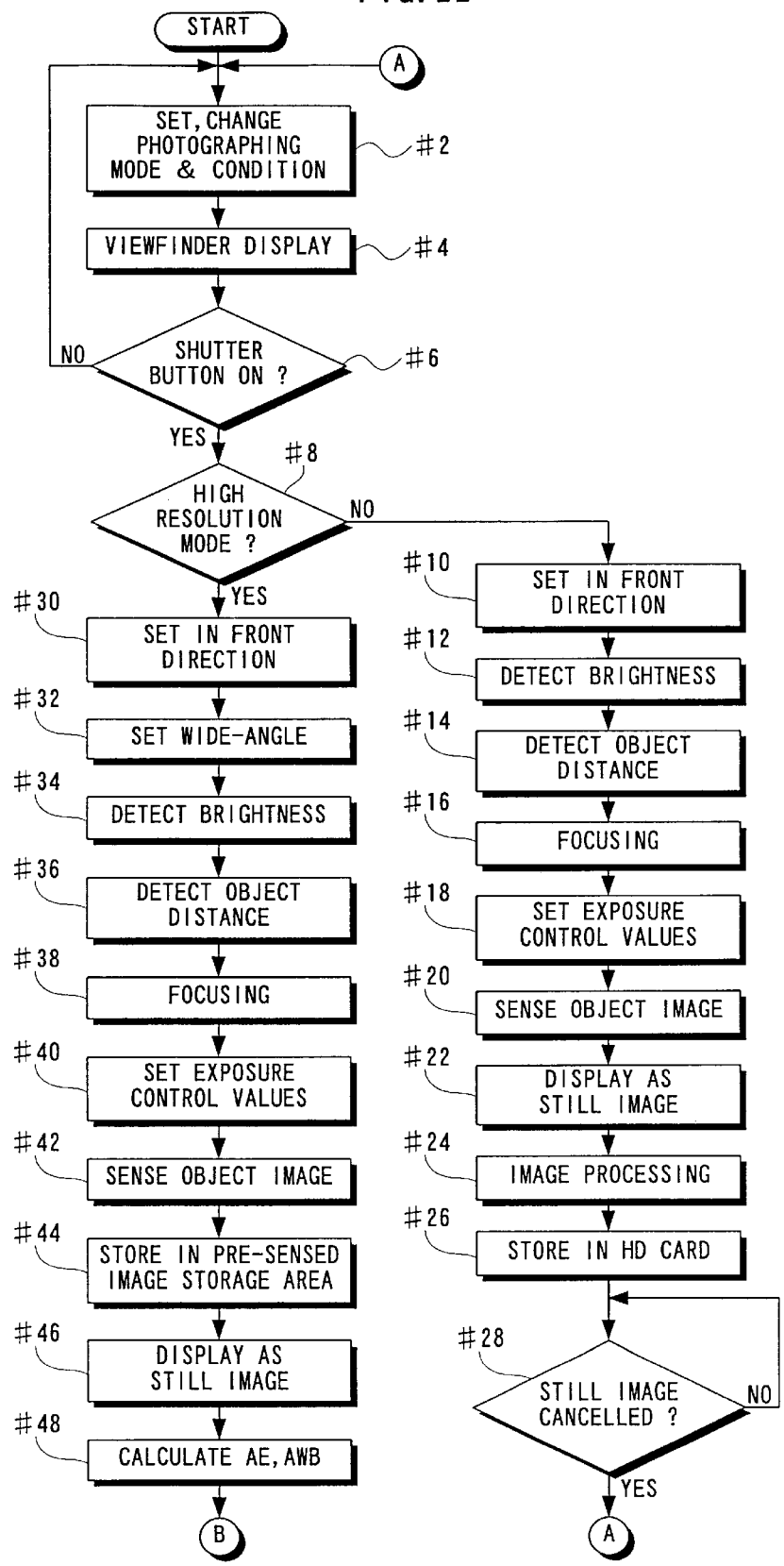
FIGS. 22 and 23 are flowcharts showing a photographing control of the electronic camera.
Figure 23:
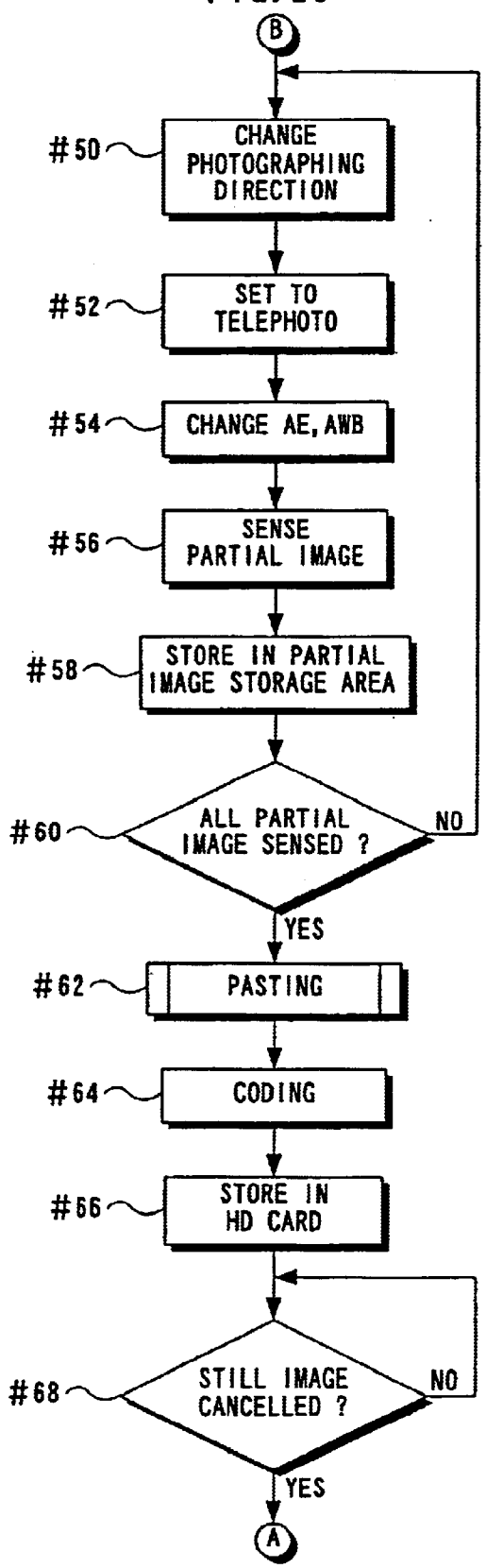
Figure 24:
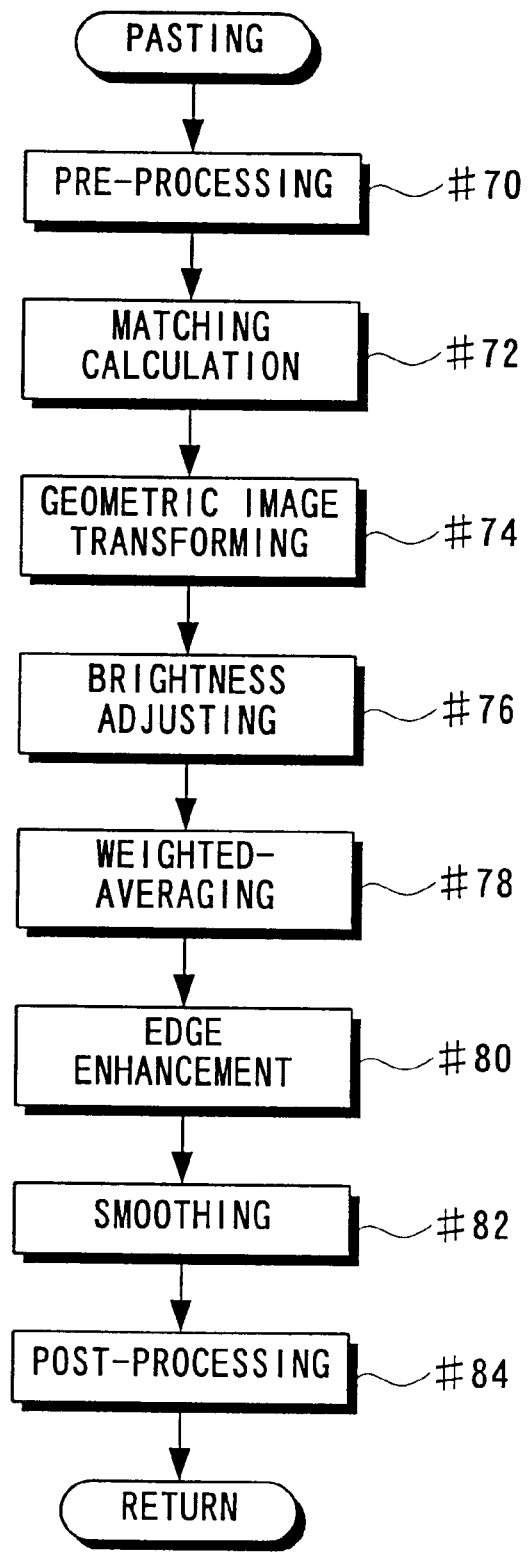
FIG. 24 is a flowchart showing a subroutine "Pasting"

FIGS. 22 and 23 are a flowchart showing a procedure of the photographing operation.

When the electronic camera 1 is activated by turning the power switch 7 on, the photographing mode and the photographing conditions are set or changed according to the set state of the high resolution mode setting button 13 and the setting switch 14 (Step #2). Then, the image sensing unit 2 is driven for the animated image display, the sensed image is displayed in the LCD section 11 for monitoring (viewfinder display), and the camera 1 enters a photographing enabled state (Step #4). This state is continued until an exposure is instructed by fully pressing the shutter bottom 6 (a loop of Steps #2 to #6). If the photographer operates the setting button 13 and/or the setting switch 14 in the meantime, the photographing mode and the photographing conditions are changed according to the operation.

When the exposure is instructed by fully pressing the shutter button 6 (YES in Step #6), it is discriminated whether the high resolution mode is set as the photographing mode (Step #8). Unless the high resolution mode is set (NO in Step #8) the photographing operation in the usual photographing mode is performed in Step #10 and subsequent Steps.

Specifically, the photographing direction (direction of the optical axis L) of the image sensing unit 2 is first set in the front direction (Step #10); an object brightness is detected by the light meter 3 (Step #12); an object distance is detected by the distance meter 4 (Step #14) and focusing is performed based on the detected object distance (Step #16). Further, exposure control values (an aperture value and an integration time of the CCD 203) are set using the detected object brightness (Step #18).

Subsequently, the object image is sensed based on the set exposure control values (Step #20). After being converted into a digital image data by the A/D converter 22, the image signal representing the sensed image outputted from the image sensing unit 2 is stored in the pre-sensed image storage area 231 of the image memory 231 in the image processor 23 and is sent to the LCD drive controller 24 via the image memory 231 to be displayed as a still image in the LCD section 11 (Step #22). This still image display allows the photographer to monitor the photographed image.

Further, the image data stored in the image memory 231 is coded by the coding circuit 238 after the post-processing circuit 237 applies corrections including the edge enhancement, smoothing and color correction (Step #24), and is stored in the HD card 10 (Step #26). In this way, the photographing operation is completed.

Upon the completion of the photographing operation, it is discriminated whether a cancel of the still image display has been instructed by the photographer operating the still image display cancel button 12 (Step #28). If such a cancel has been instructed (YES in Step #28), this routine returns to Step #2 for a next photographing operation. Unless otherwise (NO in Step #28), the still image display of the photographed image is continued until the cancel thereof is instructed (a loop of Step #28).

If the high resolution mode is set in Step #8 (YES in Step #8), Step #30 follows in which the photographing operation in the high resolution mode is performed. This photographing operation is described with respect to an exemplary case where the object image as shown in FIGS. 4 and 5 is sensed while being divided into four partial images.

First, the photographing direction (direction of the optical axis L) of the image sensing unit 2 is set to extend along the front direction (Step #30) and the zoom lens 202 of the image sensing unit 2 is set in a specified wide-angle position (Step #32). Subsequently, the object brightness is detected by the light meter 3 (Step #34), the object distance is detected by the distance meter 4 (Step #36) and focusing is performed based on the detected object distance (Step #38). Further, exposure control values (an aperture value and an integration time of the CCD 203) are set using the detected object brightness (Step #40).

The object image is then sensed based on the set exposure control values (Step #42). The sensed image is a whole object image photographed and has substantially the same screen configuration as the photographed image after the image combination. After being converted into an digital image data by the A/D converter 22, the image signal representing the sensed image and outputted from the image sensing unit 2 is stored in the pre-sensed image storage area 231a of the image memory 231 in the image processor 23 (Step #44) and is sent to the LCD drive controller 24 via the image memory 231 to be displayed as a still image in the LCD section 11 (Step #46). This still image display allows the photographer to monitor the photographed image (i.e., substantially the same image as the whole image after the image combination).

Subsequently, the exposure control values and the WHITE BALANCE adjustment value used in the respective photographing operations of sensing the partial images are calculated in the AE.AWB calculator 26 using the image data stored in the image memory 231 (Step #4). An average level of all the image data or a part of the image data of the whole object photographed at first is calculated and the exposure control values are calculated using this average level. Further, an average level of all the image data or a part of the image data of the whole object is calculated for each of color components of R, G, B, and the WHITE BALANCE adjustment value is calculated as a correction coefficient for equalizing the average levels of the respective color components of R, G, B. It should be noted that the exposure control values and the WHITE BALANCE adjustment value may be manually set.

Subsequently, the photographing direction of the image sensing unit 2 is set to extend along a first direction (direction a of FIG. 5) when the object image is photographed part by part while being divided in the partial image number set by the setting switch 14 (Step #50), and the zoom lens 202 of the image sensing unit 2 is set to a telephoto position (position where the magnification is substantially twice as large since the dividing number is 4 in the example of FIG. 5) (Step #52). Further, the exposure control values are changed to those corresponding to the first photographing direction calculated in Step #48 (exposure control values corresponding to the upper left partial image of the object when viewed from the camera toward the object in the example of FIG. 5), and WHITE BALANCE adjustment value is set at a value corresponding to the partial image to be sensed first (Step #54).

Subsequently, the upper left partial image of the object is sensed based on the set exposure control values (Step #56). After being converted into a digital image data by the A/D converter 22, the image signal representing the sensed image (partial image) and outputted from the image sensing unit 2 is stored in the partial image storage area 231b of the image memory 231 in the image processor 23 (Step #58).

It is then discriminated whether all partial images have been already sensed (Step #60). Unless all partial images have been sensed yet (NO in Step #60), this routine returns to Step #60 to sense the next partial image. Since only the first partial image has been sensed this time, this routine returns to Step #50. Then, the zoom lens 202 of the image sensing unit 2 is set to the telephoto position where the magnification is a specified value (substantially twice as large) (Step #52), and the upper right partial image of the object is sensed (Steps #54 to #58). Hereafter, the lower right and lower left partial images of the object are sensed in a similar procedure. When all partial images have been already sensed (YES in Step #60), the photographed image of the whole object is generated by combining the four partial images in such a manner as to paste them together in accordance with a subroutine "Pasting" shown in FIG. 24 (Step #62).

Specifically, the image enlarging circuit 232 first generates an image enlarged fourfold by applying interpolation to the pre-sensed image, and the pre-processing circuit 233 applies pre-processings including brightness correction, noise removal, smoothing and edge enhancement to the image data of the respective partial images and transfers these image data to the matching calculating circuit 234 (Step #70).

Subsequently, the matching calculating circuit 234 calculates matching transform amounts (geometric transform amounts of the respective partial images to matching positions on the enlarged image) by comparing the enlarged image with the respective partial images (Step #72). Based on the calculated geometric transform amounts, the geometric image transforming circuit 235 geometrically transforms the image data of the respective partial images (transforms the respective partial images to coinciding positions of the enlarged images) (Step #74).

Subsequently, the level adjusting circuit 236a of the image combining circuit 236 applies a brightness adjustment to the boundary portions (overlapping portions) to be pasted together to combine the respective partial images (processing of FIG. 17A) (Step #76). Thereafter, the weighted-averaging circuit 236b generates the image data of the boundary portions to be combined by averaging the image data of the boundary portions of the two partial images with specified weight factors (Step #78, processing of FIG. 17B). Further, the edge enhancing circuit 236c and the smoothing circuit 236d apply the edge enhancement and smoothing to the image data of the boundary portions to be combined (Steps #80, #82)

Thereafter, the image pasting circuit 236e combines the respective partial images by simply pasting the image data of the partial images excluding the boundary portions and the image data of the boundary portions to be combined, thereby generating a combined image of the whole object. This routine returns after the post-processing circuit 237 applies various corrections including the edge enhancement, smoothing and color nonuniformity correction to the combined image (Step #84).

After the coding circuit 238 codes (compresses) the combined image data of the whole image (Step #64), the image data is stored in the HD card 10 (Step #66), thereby completing the photographing operation. Upon completion of the photographing operation, it is discriminated whether the photographer has operated the still image display cancel button 12 to instruct a cancel of the still image display (Step #68). If such a cancel has been instructed (YES in Step #68), this routine returns to Step #2 for the next photographing operation. Unless otherwise (NO in Step #68), the still image display of the photographed image is continued until the cancel thereof is instructed (a loop of Step #68).

Figure 25:
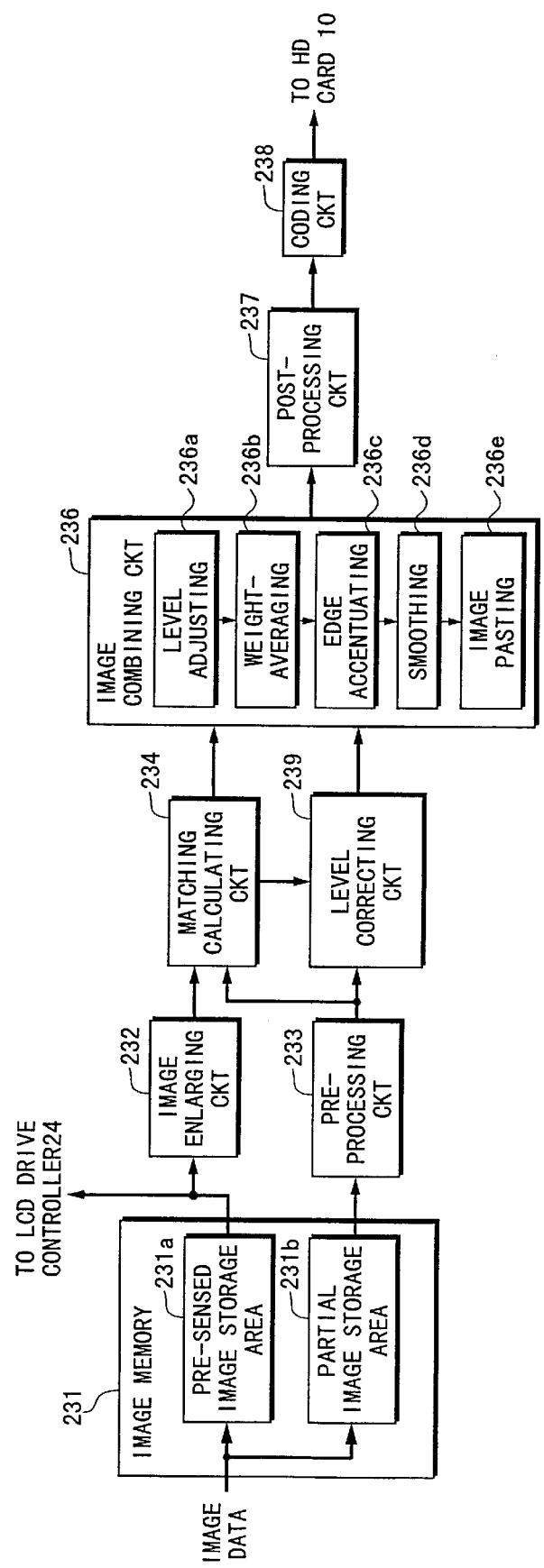
FIG. 25 is a block diagram showing a construction of a second image processor relating to the image processing in the high resolution mode.

FIG. 25 is a block diagram showing a construction of a second image processor relating to the image processing in the high resolution mode.

In the first embodiment, the respective partial images are transformed by calculating the matching transform amount substantially corresponding with the enlarged image for each partial image. However, in the second embodiment, only the combination position of the partial image in the enlarged image is calculated for each partial image, and the respective partial images are combined by pasting the boundary portions together while being arranged in the combination positions in the enlarged image. In other words, the second embodiment combines the respective partial images without correcting the perspective image distortions, thereby designing to speed up the image combination by simplifying it. If the object distance is relatively long, an angle of displacement of the optical axis L of the image sensing unit 2 from the front direction when the partial image is sensed is small and the degree of perspective image distortion caused in each partial images is small. Thus, even in the second embodiment, the combined image of high resolution can be effectively obtained under such a photographing condition.

The block construction diagram of FIG. 25 differs from the one of FIG. 7 in that the geometric image transforming circuit 235 is replaced by a level correcting circuit 239.

In FIG. 25, the level correcting circuit 239 corrects the level of the partial image based on a brightness difference between a part of the image in the combination position on the enlarged image and the partial image corresponding to this combination position. This is adapted to make differences in brightness between the partial images unnoticeable after the image combination by conforming the brightness of each partial image to that of the enlarged image since the image combining circuit 236 finally generates substantially the same image as the enlarged image by combining the respective partial images. The matching calculating circuit 234 in FIG. 25 calculates only areas of the enlarged image corresponding with the respective partial images, but does not calculate most corresponding areas in the enlarged image by transforming the respective partial images.

Since the second embodiment differs from the first embodiment mainly in the operations of the matching calculating circuit 234 and the level correcting circuit 239, the following description is given, centered on these two circuits.

In the matching calculating circuit 234, the respective partial images are moved in the enlarged image at intervals corresponding to a specified number of pixels along vertical and horizontal directions while being compared with the enlarged image, and positions where the respective partial images most correspond with the enlarged image are calculated as combination positions. In such a case, the degree of correspondence between the enlarged image and each partial image is judged based on a total value $\Sigma|\Delta Di|$ of absolute values $|\Delta Di|$ (i=1, 2, . . . n) of the brightness differences between the pixel data of the enlarged image and the pixel data of the partial image corresponding to the pixel position of the pixel data of the enlarged image, and a position where this total $\Sigma|\Delta Di|$ is at minimum is calculated as a combination position. Since a moving range of each partial image in the enlarged image is roughly known (an upper right corner range, a lower left range, etc.), the combination position is determined within this roughly defined moving range in consideration of the scanning accuracy of the taking lens 2 and a relative displacement of the partial image caused by hand shake.

Upon the determination of the combination positions of the respective partial images, a brightness correction value per pixel $\Sigma|\Delta Di|/n$ is calculated by dividing the total brightness difference $\Sigma|\Delta Di|$ in each combination position by a total number n of pixels constituting the partial image. The level correcting circuit 239 corrects the brightness difference between the enlarged image and each partial image by adding the brightness correction value $\Sigma|\Delta Di|/n$ to the pixel data of the partial image. This correction reduces variations in brightness at the pasted portions (boundary portions) caused by the combination of the respective partial images.

Figure 26:
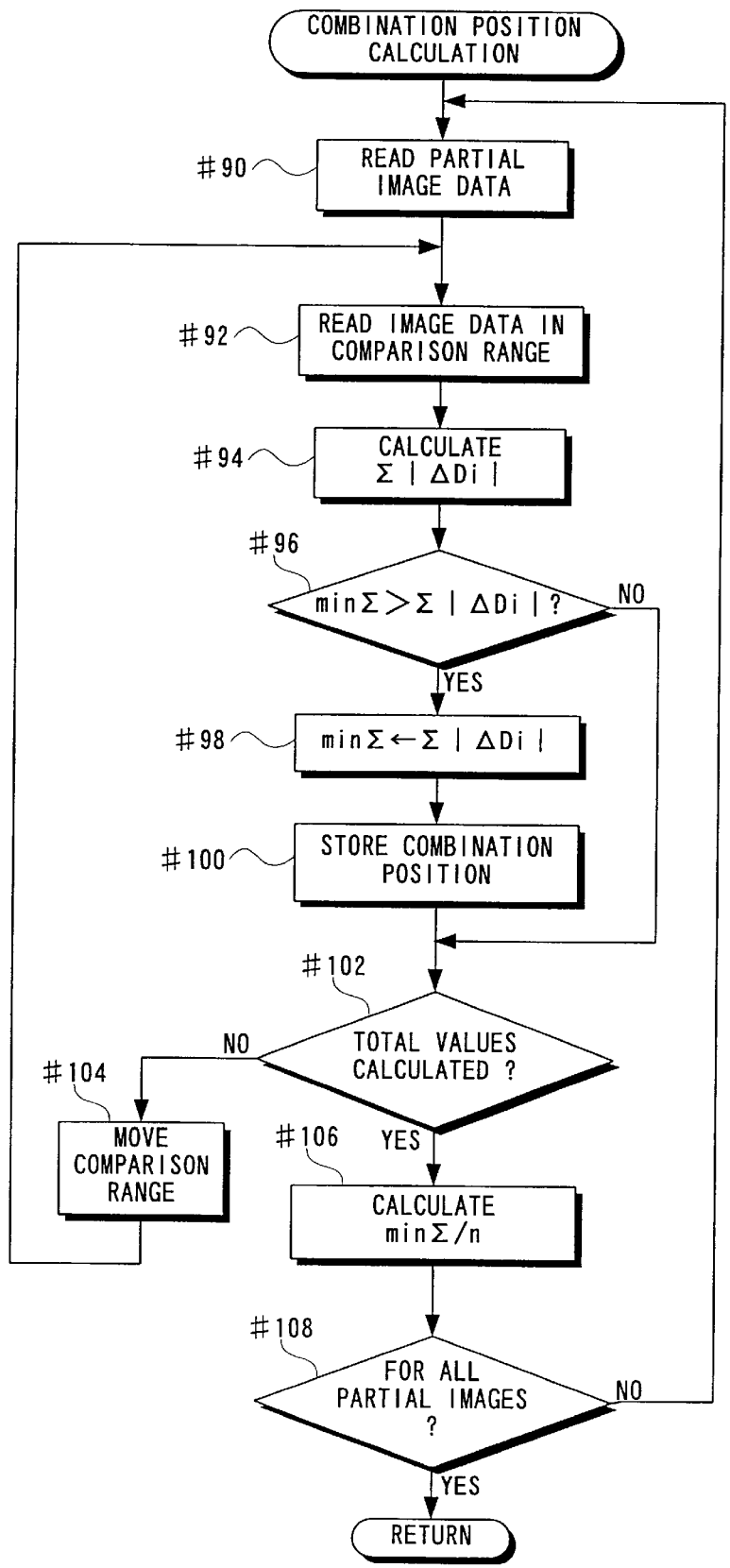
FIG. 26 is a flowchart showing a routine "Combination Position Calculation".

FIG. 26 is a flowchart showing a processing of calculating the combination position according to the second embodiment. The flowchart of FIG. 26 corresponds to the matching calculation in Step #72 of FIG. 24. Accordingly, the operation of Step #72 is replaced by the combination position calculation shown in FIG. 26, and a simplified image combination can be realized by performing the photographing operation in the high resolution mode in accordance with the flowchart of FIGS. 22 to 24.

In the combination position calculation shown in FIG. 26, pixel data ga(i) constituting a partial image GA are successively read from the partial image storage area 231b of the image memory 231 (Step #90). Subsequently, corresponding pixel data g(i) in a specified comparison range of the enlarged image G stored in the unillustrated memory of the matching calculating circuit 234 are successively read (Step #92). Consequently, a total value $\Sigma|\Delta Di|$ (i=1, 2, . . . n: where n is a total number of pixel data constituting the partial image) of absolute values of the brightness differences between the two pixel data ga(i) and g(i) $|\Delta Di|=|ga(i)-g(i)|$ is calculated (Step #94).

It is then discriminated whether the calculated total value is smaller than the minimum of the total values calculated thus far (Step #96). If min$\Sigma$<$\Sigma|\Delta Di|$ (YES in Step #96), the total value $\Sigma|\Delta Di|$ calculated this time is renewably stored in a memory (not shown) for min$\Sigma$ provided in the matching calculating circuit 234 (Step #98), and the position of the comparison range of the partial image $G_A$ on the enlarged image G is stored as a combination position in a memory (not shown) provided in the matching calculating circuit 234 (Step #100). On the other hand, if min$\Sigma$=$|\Delta Di|$ (NO in Step #96), Step #102 follows without changing the contents of the memories for the min$\Sigma$ and the combination positions.

In Step #102, it is discriminated whether the total values $\Sigma|\Delta Di|$ of the absolute values of the brightness differences have been already calculated for the entire comparison range. If the calculation has not been finished (NO in Step #102), the comparison range is moved in a specified moving direction (e.g., vertical or horizontal direction) by a specified amount (e.g., 1 to several pixels (Step #104) and this routine returns to Step #92. Subsequently, the pixel data g(i) of the enlarged image G corresponding to the comparison range after the movement are successively read; the total value $\Sigma|\Delta Di|$ of the absolute values of the brightness differences between the read pixel data g(i) and the pixel data ga(i) of the partial image $G_A$ is calculated; and this total value $\Sigma|\Delta Di|$ and the min are compared and a specified processing according to the comparison result is performed (Steps #92 to #100). Hereafter, a position (i.e., combination position) of the comparison range in the enlarged image G where the total value $\Sigma|\Delta Di|$ of the absolute values of the brightness differences between the enlarged image and the partial image GA is at minimum is calculated by successively changing the comparison range in a similar manner (a loop of Steps #92 to 104).

Upon the calculation of the combination position for the partial image $G_A$ (YES in Step #102), a brightness correction value min$\Sigma$/n is calculated by dividing the minimum value min$\Sigma$ of the total values $\Sigma|\Delta Di|$ of the brightness differences by the total number n of the pixel data constituting the partial image $G_A$, and this calculation result is inputted to the level correcting circuit 239 (Step #106).

It is then discriminated whether the combination position has been already calculated for all partial images (Step #108). If the calculation has not yet been finished (NO in Step #108) this routine returns to Step #90 to calculate the combination position for the next partial image (a loop of Steps #90 to #104). Since the combination position of the first partial image $G_A$ is calculated this time, this routine returns to Step #90 to calculate the combination position for a next partial image $G_B$. When the calculation of the combination position and the brightness correction value min$\Sigma$/n for all partial images $G_A$ to $G_D$ (YES in Step #108) is completed, the combination position calculation is completed.

The information on the combination positions calculated by the matching calculating circuit 234 is inputted to the image combining circuit 236, and the image data $G_A$ to $G_D$ of the respective partial images are inputted to the image combining circuit 236 after having the brightness correction value min$\Sigma$/n added by the level correcting circuit 239. Thereafter, the whole image is generated by pasting the respective partial images $G_A$ to $G_D$ together at the boundary portions in accordance with the processing in Step #74 and subsequent Steps of FIG. 24.

Although all pixel data constituting the partial images are used in the aforementioned matching calculation, a reduction in processing speed may be suppressed by using image data having a reduced number of pixels by weeding out the image data every block or every several pixels.

In the foregoing embodiments, a plurality of partial images are continuously sensed by the same CCD 203 by changing the direction of the optical axis L of the taking lens 202 of the image sensing unit 2. However, an image of the whole object and a plurality of partial images of the object may be simultaneously sensed by splitting an object light image into a light image of the whole object and a plurality of partial light images by a splitter such as a prism, and by focusing these light images on sensing surfaces of a plurality of CCDs.

In the high resolution mode of the foregoing embodiments, the whole object is first photographed and, after the photographed image is displayed for monitoring, the object is photographed part by part and a plurality of partial images are combined to generate a whole image. However, the whole object may be photographed after being photographed part by part and be displayed for monitoring.

In generating the photographed image of the whole object by photographing the object while dividing into a plurality of parts and combining the partial images, the image of the whole object which serves as a reference for the combination positions of the partial images is sensed when the partial images are sensed, and the whole object image is displayed as a still image in the LCD section 11. Accordingly, the photographer can promptly monitor the image to be obtained until the image combination of the partial images is completed.

Also, the image of the whole object is sensed when the partial images are sensed. The sensed whole object image is enlarged by the predetermined magnification based on the number of divisions of the object. The respective partial images are geometrically transformed so as to agree with the corresponding portion of the enlarged whole object image, and pasted together. Accordingly, combination of the respective partial images can be performed accurately. The geometrical transforming assures proper correction of image displacement and color nonuniformity, providing an improved combined image.

In the foregoing embodiment, the respective partial images are geometrically transformed to perform image correction before the combination. However, it should be appreciated to apply the geometrical transformation for a combined image.

As described above, the image generating apparatus generates a sensed image of a whole object by combining a plurality of images obtained by photographing the object part by part. Specifically, an image of the whole object is sensed when images of a plurality of divided parts of the whole object are sensed. The respective combining positions of the plurality of partial images are calculated with reference to the whole image, and the plurality of partial images are combined into a whole image in accordance with the calculated combining positions. Accordingly, accurate combination of partial images can be accomplished.

Also, each of the sensed partial images is geometrically transformed so as to agree with a corresponding portion of the whole object image. The geometrical transformation corrects deformations in the partial image, consequently assuring a proper quality for a combined image. Also, various corrections for each partial image can be performed more easily and more precisely.

Further, the sensed image of the whole object is displayed as a still image in the display device before a plurality of partial images are combined. Therefore, the photographer can promptly monitor an image, which is similar to the image of the whole object and is obtained by combining the partial images, immediately after the image sensing operation. This improves the operability of the image generating apparatus.

When a plurality of partial images are sensed, an image of the whole object is sensed and displayed as a still image in the display, and the respective partial images are positioned on the basis of this whole image and pasted together to generate a combined image.

Accordingly, the photographer can monitor substantially the same image as the combined image of the partial images immediately after the image sensing operation.

Therefore, a more precise combined image can be monitored.

Further, a first image sensing for the whole object and a second image sensing for the object part by part are carried out by an image sensor in an image sensing unit. In the image sensing unit, the lens capable of changing the magnification and the image sensor for sensing the object light image by photoelectrically converting it into electrical signals are integrally constructed such that the direction of the optical axis is changeable. The whole image of the object and the partial images thereof are successively sensed by changing the direction of the optical axis of the image sensing unit and the magnification thereof. Accordingly, the image sensing system for sensing the image of the whole object and the partial images thereof for monitoring is allowed to have a compact construction. Further, smaller differences in image quality resulting from differences in the sensing optical system between the image of the whole object and the partial images thereof are smaller, the image combination can be more easily performed, and a reduction in image quality after the image combination can be suppressed.

Furthermore, the plurality of partial images are applied with the level correction, and the image data of the boundary portions are weighted-averaged, and then applied with the edge enhancement. Thereafter, such processed image data of the boundary portions are combined with image data of the other portions of the adjacent partial images. Accordingly, even if an error occurs in the positioning, the positional disagreement can be corrected to a unnoticeable level while holding the contrast at a proper level.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image generating apparatus comprising:
   an image sensing device which senses an image of an object;
   an image processor which processes a sensed image;
   a display device which displays a processed image; and
   a controller which controls the image sensing device, the image processor, and the display device so that:
   the image sensing device executes a first sensing of sensing a whole image in a specified region of the object, and a second sensing of sensing partial images in a plurality of divided parts of the specified region;
   the image processor combines the plurality of sensed partial images into a single image corresponding to the whole image in the specified region; and the display device displays the sensed whole image while the image processor combines the sensed partial images.

2. An image generating apparatus according to claim 1, wherein the size of each sensed partial image is substantially the same as that of the sensed whole image, and the combination of sensed partial images is performed with reference to the sensed whole image.

3. An image generating apparatus according to claim 1, wherein the image sensing device includes:
- a sensor which receives a light image of an object to generate image data corresponding to the light image;
- an optical system which introduces a light image to the sensor, the optical system being operable to change the magnification of a light image; and
- a changer which changes the optical axis of the optical system with respect to the sensor.

4. An image generating apparatus according to claim 3, wherein:
- the magnification and the optical axis of the optical system in the first sensing are set so that the sensor senses the whole image in the specified region, and
- the magnification and the optical axis of the optical system in the second sensing are set so that the sensor senses a partial image in each divided part of the specified region, the boundary portions of the partial image overlapping the boundary portion of the adjacent divided parts, and the sensor senses the partial image at substantially the same sensing area thereof as when sensing the whole image.

5. An image generating apparatus according to claim 1, further comprising a memory which stores the sensed whole image and the sensed partial images.

6. An image generating apparatus according to claim 1, the image generating apparatus being an electronic camera.

7. An image generating apparatus comprising:
- an image sensing device which senses an image of an object;
- an image processor which processes a sensed image; and
- a controller which controls the image sensing device and the image processor so that:
  - the image sensing device executes a first sensing of sensing a whole image in a specified region of the object and storing the whole image, and a second sensing of sensing partial images in a plurality of divided parts of the specified region; and
  - the image processor combines the plurality of sensed partial images into a single image corresponding to the whole image in the specified region, each sensed partial image being transformed on the basis of the stored whole image itself.

8. An image generating apparatus according to claim 7, wherein each sensed partial image is transformed with reference to a corresponding part of the sensed whole image, and the transformed partial images are combined into a single image corresponding to the whole image.

9. An image generating apparatus according to claim 7, wherein the image sensing device includes:
- a sensor which receives a light image of an object to generate image data corresponding to the light image;
- an optical system which introduces a light image to the sensor, the optical system being operable to change the magnification of a light image; and
- a changer which changes the optical axis of the optical system with respect to the sensor.

10. An image generating apparatus according to claim 9, wherein:
- the magnification and the optical axis of the optical system in the first sensing are set so that the sensor senses the whole image in the specified region, and
- the magnification and the optical axis of the optical system in the second sensing are set so that the sensor senses a partial image in each divided part of the specified region, the boundary portions of the partial image overlapping the boundary portion of the adjacent divided parts, and the sensor senses the partial image at substantially the same sensing area thereof as when sensing the whole image.

11. An image generating apparatus according to claim 7, further comprising a memory which stores the sensed whole image and the sensed partial images.

12. An image generating apparatus according to claim 7, the image generating apparatus being an electronic camera.

13. An image generating apparatus comprising:
- an image sensing device which senses an image of an object;
- an image processor which processes a sensed image; and
- a controller which controls the image sensing device and the image processor so that:
  - the image sensing device executes a first sensing of sensing a whole image in a specified region of the object and storing the whole image, and a second sensing of sensing partial images in a plurality of divided parts of the specified region; and
  - the image processor combines the plurality of sensed partial images into a single image corresponding to the whole image by determining respective positions of the sensed partial images on the basis of the stored whole image itself, and combining the sensed partial images with one another based on the determined positions.

14. An image generating apparatus according to claim 13, wherein the size of each sensed partial image is substantially the same as that of the sensed whole image.

15. An image generating apparatus according to claim 13, wherein the image sensing device includes:
- a sensor which receives a light image of an object to generate image data corresponding to the light image;
- an optical system which introduces a light image to the sensor, the optical system being operable to change the magnification of a light image; and
- a changer which changes the optical axis of the optical system with respect to the sensor.

16. An image generating apparatus according to claim 15, wherein:
- the magnification and the optical axis of the optical system in the first sensing are set so that the sensor senses the whole image in the specified region, and
- the magnification and the optical axis of the optical system in the second sensing are set so that the sensor senses a partial image in each divided part of the specified region, the boundary portions of the partial image overlapping the boundary portion of the adjacent divided parts, and the sensor senses the partial image at substantially the same sensing area thereof as when sensing the whole image.

17. An image generating apparatus according to claim 13, further comprising a memory which stores the sensed whole image and the sensed partial images.

18. An image generating apparatus according to claim 13, the image generating apparatus being an electronic camera.

19. An image generating method comprising the steps of:
preparing a whole image of an object and partial images in a plurality of divided parts of the object;
transforming each partial image on the basis of the prepared whole image itself, using the whole image as a template; and
combining the plurality of the transformed partial images into a single image corresponding to the whole image.

20. An image generating method comprising the steps of:
preparing a whole image of an object and partial images in a plurality of divided parts of the object;
determining respective positions of the partial images on the basis of the prepared whole image itself, using the whole image as a template; and
combining the partial images with one another based on the determined positions.

* * * * *